United States Patent
Huang et al.

(10) Patent No.: US 12,389,404 B2
(45) Date of Patent: Aug. 12, 2025

(54) METHOD FOR UPLINK BEAM INDICATION AND DEVICE

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 803 days.

(21) Appl. No.: 17/267,478

(22) PCT Filed: Aug. 15, 2019

(86) PCT No.: PCT/CN2019/100743
§ 371 (c)(1),
(2) Date: Feb. 9, 2021

(87) PCT Pub. No.: WO2020/035017
PCT Pub. Date: Feb. 20, 2020

(65) Prior Publication Data
US 2021/0329624 A1    Oct. 21, 2021

(30) Foreign Application Priority Data

Aug. 17, 2018   (CN) .................. 201810942012.4

(51) Int. Cl.
*H04W 72/21*     (2023.01)
*H04B 7/0404*    (2017.01)
(Continued)

(52) U.S. Cl.
CPC .......... *H04W 72/21* (2023.01); *H04B 7/0404* (2013.01); *H04B 7/0617* (2013.01); *H04L 5/0048* (2013.01); *H04W 72/046* (2013.01)

(58) Field of Classification Search
CPC .. H04W 72/21; H04W 72/046; H04B 7/0404; H04B 7/0617; H04L 5/0048
See application file for complete search history.

(56) References Cited

U.S. PATENT DOCUMENTS

2012/0320859 A1   12/2012  Ahn et al.
2013/0258885 A1   10/2013  Yu et al.
(Continued)

FOREIGN PATENT DOCUMENTS

CA    3024010 A1    11/2017
CA    3042828 A1     5/2018
(Continued)

OTHER PUBLICATIONS

First Office Action and search report for corresponding Korean Patent Application 10-2021-7007868, issued Jan. 19, 202, and its English Translation provided by foreign associate.
(Continued)

*Primary Examiner* — Brenda H Pham
(74) *Attorney, Agent, or Firm* — Ladas & Parry, LLP

(57) ABSTRACT

A method for uplink beam indication and a device are provided. The method includes: indicating by a base station dynamically, a transmission beam of a first uplink signal, to a terminal through transmission beam indication information. The first uplink signal includes at least one of: a sounding reference signal SRS or a signal transmitted on a physical uplink control channel PUCCH.

20 Claims, 3 Drawing Sheets

--- receiving signaling information sent by a base station dynamically, where the signaling information includes transmission beam indication information used to indicate a transmission beam of a first uplink signal, the first uplink signal is a signal transmitted on a PUSCH, and the transmission beam indication information is used to indicate an index of one or more reference signals from multiple candidate reference signals    — 61 determining the transmission beam of the first uplink signal according to the signaling information    — 62

(51) Int. Cl.
  *H04B 7/06* (2006.01)
  *H04L 5/00* (2006.01)
  *H04W 72/044* (2023.01)

(56) References Cited

U.S. PATENT DOCUMENTS

| | | | |
|---|---|---|---|
| 2017/0317866 A1* | 11/2017 | Stirling-Gallacher | ........................ H04L 5/0048 |
| 2018/0042000 A1* | 2/2018 | Zhang | ................... H04W 72/23 |
| 2018/0206132 A1 | 7/2018 | Guo et al. | |
| 2018/0227094 A1* | 8/2018 | Liu | ..................... H04B 7/06966 |
| 2019/0124538 A1 | 4/2019 | Tang et al. | |
| 2019/0260541 A1 | 8/2019 | Liu et al. | |

FOREIGN PATENT DOCUMENTS

| | | |
|---|---|---|
| CN | 104205911 A | 12/2014 |
| CN | 108023694 A | 5/2018 |
| CN | 108282863 A | 7/2018 |
| WO | 2012015218 A1 | 2/2012 |
| WO | 2018089115 A1 | 5/2018 |

OTHER PUBLICATIONS

"Discussion on beam indication for UL transmission," 3GPP TSG RAN WG1 NR AH#3, R1-1715962, Nagoya, Japan, Sep. 18-21, 2017, Agenda item: 6.2.2.6, Source: Samsung, all pages.

"Corrections on UL Beam Management," 3GPP TSG RAN WG1 Meeting #92bis, R1-1804362, Sanya, China, Apr. 16-20, 2018,, Agenda item: 7.1.2.2.6, Source: Samsung, all pages.

"Beam Management Views and Designs", R1-1609691, 3GPP TSG RAN WG1 Meeting #86b, Lisbon, Portugal, Oct. 10-14, 2016.

"Discussion on beam indication for UL transmission", R1-1717620, 3GPP TSG RAN WG1 Meeting 90bis, Prague, Czech Republic, Oct. 9-13, 2017.

"Beam Indication, Measurements and Reporting", R1-1720890, 3GPP TSG RAN WG1 Meeting #91, Reno, Nevada, USA Nov. 27-Dec. 1, 2017.

International Search Report from PCT/CN2019/100743 dated Oct. 28, 2019, with English translation from WIPO.

Written Opinion of the International Searching Authority from PCT/CN2019/100743 dated Oct. 28, 2019, with English translation from WIPO.

International Preliminary Report on Patentability from PCT/CN2019/100743 dated Feb. 23, 2021, with English translation from WIPO.

First Office Action from TW app. No. 108129220, dated Jun. 3, 2021, with machine English translation.

First Office Action and search report for Indian Patent Application 202127011057, issued Feb. 4, 2022.

Samsung, "Discussion on beam indication for UL transmission", R1-1720304, 3GPP TSG RAN WG1 Meeting #91, Reno, USA, Nov. 27-Dec. 1, 2017, all pages.

Ericsson, "On UL beam indication", R1-1718747, 3GPP TSG-RAN WG1 #90bis, Prague, Czech Republic, Oct. 9-13, 2017, all pages.

Extended European Search Report from EP app. No. 19849473.4, dated Sep. 2, 2021, all pages.

* cited by examiner

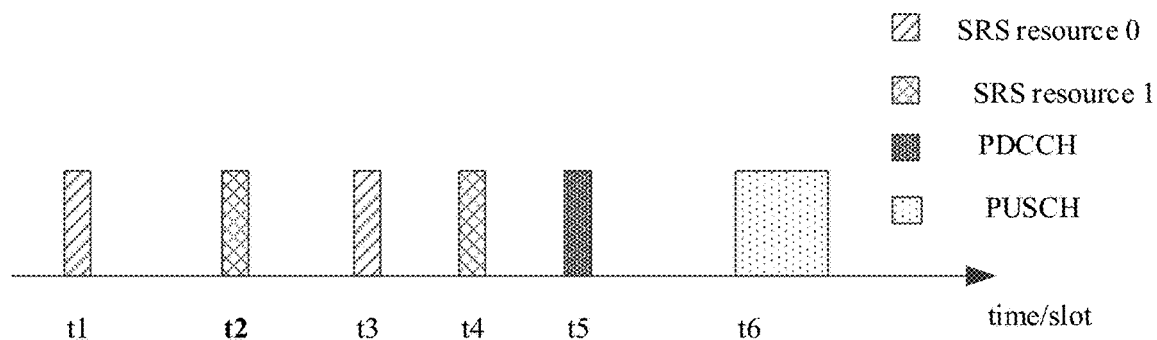
FIG. 1
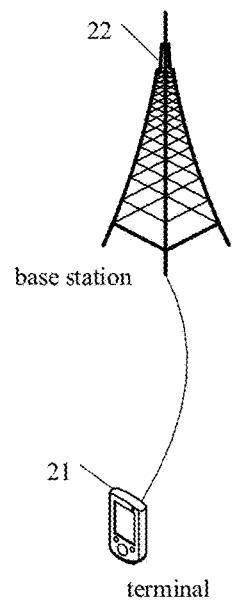
FIG. 2
indicating by a base station dynamically, a transmission beam of a first uplink signal, to a terminal through transmission beam indication information, where the first uplink signal includes at least one of an SRS or a signal transmitted on a PUCCH  ⸺ 31
FIG. 3 indicating by a base station dynamically, a transmission beam of a first uplink signal, to a terminal through transmission beam indication information, where the first uplink signal is a signal transmitted on a PUSCH, and the transmission beam indication information is used to indicate one or more reference signals from multiple candidate reference signals  —41

FIG. 4 receiving signaling information sent by a base station dynamically, where the signaling information includes transmission beam indication information used to indicate a transmission beam of a first uplink signal, and the first uplink signal includes at least one of an SRS or a signal transmitted on a PUCCH  —51 determining the transmission beam of the first uplink signal according to the signaling information  —52

FIG. 5 receiving signaling information sent by a base station dynamically, where the signaling information includes transmission beam indication information used to indicate a transmission beam of a first uplink signal, the first uplink signal is a signal transmitted on a PUSCH, and the transmission beam indication information is used to indicate an index of one or more reference signals from multiple candidate reference signals  —61 determining the transmission beam of the first uplink signal according to the signaling information  —62

FIG. 6

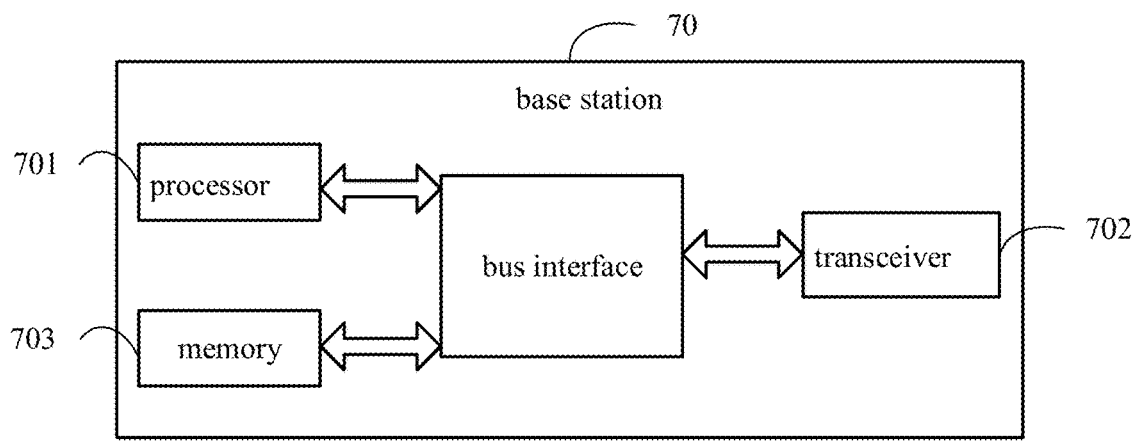

FIG. 7

METHOD FOR UPLINK BEAM INDICATION AND DEVICE

CROSS-REFERENCE TO RELATED APPLICATIONS

The present application is the U.S. national phase of PCT Application No. PCT/CN2019/100743 filed on Aug. 15, 2019, which claims a priority to the Chinese patent application 201810942012.4 filed on Aug. 17, 2018, the disclosures of which are incorporated herein by reference in their entireties.

TECHNICAL FIELD

The present disclosure relates to the technical field of mobile communications, and in particular to a method for uplink beam indication and a device.

BACKGROUND

A radio transmitter (such as a base station gNB or a user equipment (User Equipment, UE)) equipped with multiple antennas may transmit a radio signal by forming a beam pointing in a specific direction through beamforming. A width and a direction of the beam may be flexibly adjusted by applying an appropriate weight on each antenna unit. Beamforming may be performed in a digital domain or an analog domain.

When each antenna unit has a separate baseband module, each antenna unit may independently control an amplitude and a phase of a signal transmitted on the antenna unit, so that digital beamforming can be realized. Digital beamforming may be narrowband beamforming. That is, at a given moment, the transmitter may use different digital beamformings in different frequency bands, and there is no need to use the same digital beamforming in the entire system bandwidth.

If multiple antenna units share the same digital baseband component and each antenna unit has an independent phase shifter, these antenna units may form analog beams. In this case, for a signal transmitted on an antenna unit, only the transmission phase can be independently adjusted, and the amplitude cannot be independently adjusted. Therefore, the analog beam is usually broadband (applied to the entire system bandwidth) and can only be multiplexed in the time domain.

Since the use of digital modules is reduced, a transmitter adopting purely analog beamforming has lower hardware cost and power consumption compared with a transmitter adopting digital beamforming. In an actual system, beamforming includes digital beamforming, analog beamforming, and hybrid analog and digital beamforming.

In the related technologies, adjustment to uplink beamforming for a terminal has problems such as slow adjustment speed and high overhead. Therefore, a solution that can improve the efficiency of uplink beamforming adjustment is needed.

SUMMARY

The technical problem to be solved by embodiments of the present disclosure is to provide a method for uplink beam indication and a device, so as to improve the adjustment efficiency of uplink beamforming.

In order to solve the above technical problem, embodiments of the present disclosure provide a method for uplink beam indication, including:
  indicating by a base station dynamically, a transmission beam of a first uplink signal, to a terminal through transmission beam indication information;
  the first uplink signal includes at least one of: a sounding reference signal (SRS) or a signal transmitted on a physical uplink control channel (PUCCH).

Optionally, embodiments of the present disclosure also provide another method for uplink beam indication, including:
  indicating by a base station dynamically, a transmission beam of a first uplink signal, to a terminal through transmission beam indication information;
  the first uplink signal is a signal transmitted on a physical uplink shared channel (PUSCH), the transmission beam indication information is used to indicate one or more reference signals from multiple candidate reference signals, the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

Optionally, embodiments of the present disclosure also provide another method for uplink beam indication, including:
  receiving signaling information sent by a base station dynamically, where the signaling information includes transmission beam indication information used to indicate a transmission beam of a first uplink signal; and
  determining the transmission beam of the first uplink signal according to the signaling information;
  the first uplink signal includes at least one of: a sounding reference signal (SRS) or a signal transmitted on a physical uplink control channel (PUCCH).

Optionally, embodiments of the present disclosure also provide another method for uplink beam indication, including:
  receiving signaling information sent by a base station dynamically, where the signaling information includes transmission beam indication information used to indicate a transmission beam of a first uplink signal; and
  determining the transmission beam of the first uplink signal according to the signaling information;
  the first uplink signal is a signal transmitted on a physical uplink shared channel (PUSCH), the transmission beam indication information is used to indicate an index of one or more reference signals from multiple candidate reference signals, the candidate reference signals include a reference signal other than a first reference signal, and the first reference signal is a reference signal corresponding to an uplink reference signal resource that is configured by the base station for a terminal and is used for acquiring channel state information (CSI) in an uplink transmission mode corresponding to the PUSCH.

Embodiments of the present disclosure also provide a base station, including: a transceiver, a memory, a processor, and a computer program stored on the memory and executable by the processor;
  the processor is configured to indicate dynamically a transmission beam of a first uplink signal to a terminal through transmission beam indication information;

the first uplink signal includes at least one of: a sounding reference signal (SRS) or a signal transmitted on a physical uplink control channel (PUCCH).

Optionally, embodiments of the present disclosure also provide another base station, including: a transceiver, a memory, a processor, and a computer program stored on the memory and executable by the processor;
the processor is configured to indicate dynamically a transmission beam of a first uplink signal to a terminal through transmission beam indication information;
the first uplink signal is a signal transmitted on a physical uplink shared channel (PUSCH), the transmission beam indication information is used to indicate one or more reference signals from multiple candidate reference signals, the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

Optionally, embodiments of the present disclosure also provide another base station, including:
a transmission and reception unit, configured to indicate dynamically a transmission beam of a first uplink signal to a terminal through transmission beam indication information;
the first uplink signal includes at least one of: a sounding reference signal (SRS) or a signal transmitted on a physical uplink control channel (PUCCH).

Optionally, embodiments of the present disclosure also provide another base station, including:
a transmission and reception unit, configured to indicate dynamically a transmission beam of a first uplink signal to a terminal through transmission beam indication information;
the first uplink signal is a signal transmitted on a physical uplink shared channel (PUSCH), the transmission beam indication information is used to indicate one or more reference signals from multiple candidate reference signals, the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

Embodiments of the present disclosure also provide a terminal, including: a transceiver, a memory, a processor, and a computer program stored on the memory and executable by the processor;
the processor is configured to receive signaling information sent by a base station dynamically, where the signaling information includes transmission beam indication information used to indicate a transmission beam of a first uplink signal; and
determine the transmission beam of the first uplink signal according to the signaling information;
the first uplink signal includes at least one of: a sounding reference signal (SRS) or a signal transmitted on a physical uplink control channel (PUCCH).

Optionally, embodiments of the present disclosure also provide another terminal, including: a transceiver, a memory, a processor, and a computer program stored on the memory and executable by the processor;
the processor is configured to receive signaling information sent by a base station dynamically, where the signaling information includes transmission beam indication information used to indicate a transmission beam of a first uplink signal; and
determine the transmission beam of the first uplink signal according to the signaling information;
the first uplink signal is a signal transmitted on a physical uplink shared channel (PUSCH), the transmission beam indication information is used to indicate an index of one or more reference signals from multiple candidate reference signals, the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

Optionally, embodiments of the present disclosure also provide another terminal, including:
a transmission and reception unit, configured to receive signaling information sent by a base station dynamically, where the signaling information includes transmission beam indication information used to indicate a transmission beam of a first uplink signal; and
a beam determining unit, configured to determine the transmission beam of the first uplink signal according to the signaling information;
the first uplink signal includes at least one of: a sounding reference signal (SRS) or a signal transmitted on a physical uplink control channel (PUCCH).

Optionally, embodiments of the present disclosure also provide another terminal, including:
a transmission and reception unit, configured to receive signaling information sent by a base station dynamically, where the signaling information includes transmission beam indication information used to indicate a transmission beam of a first uplink signal; and
a beam determining unit, configured to determine the transmission beam of the first uplink signal according to the signaling information;
the first uplink signal is a signal transmitted on a physical uplink shared channel (PUSCH), the transmission beam indication information is used to indicate an index of one or more reference signals from multiple candidate reference signals, and the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

Embodiments of the present disclosure also provide a computer readable storage medium including instructions, and the instructions, when being executed by a computer, cause the computer to execute the above method for uplink beam indication.

Compared with the related technologies, the method for uplink beam indication and the device provided by the embodiments of the present disclosure can increase the flexibility of uplink beamforming and improve the efficiency of beam adjustment, thereby improving the performance of the communication system and improving robustness of uplink transmission in scenarios such as mobility, rotation and blocking of a terminal.

BRIEF DESCRIPTION OF THE DRAWINGS

To better clarify technical solutions of embodiments of the present disclosure, drawings used in descriptions of embodiments of the present disclosure are briefly introduced hereinafter. Apparently, the described drawings merely illustrate a part of the embodiments of the present disclosure. A person ordinary skilled in the art can obtain other drawings based on the described drawings without any creative efforts.

FIG. 1 is a schematic diagram of a relationship between a transmission beam of a PUSCH and a transmission beam of an SRS;

FIG. 2 is a block diagram of a radio communication system to which embodiments of the present disclosure are applied;

FIG. 3 is a flowchart of a method for uplink beam indication on a base station side according to embodiments of the present disclosure;

FIG. 4 is another flowchart of a method for uplink beam indication on a base station side according to embodiments of the present disclosure;

FIG. 5 is a flowchart of a method for uplink beam indication on a terminal side according to embodiments of the present disclosure;

FIG. 6 is another flowchart of a method for uplink beam indication on a terminal side according to embodiments of the present disclosure;

FIG. 7 is a schematic structural diagram of a base station according to embodiments of the present disclosure;

DETAILED DESCRIPTION

Figure 8:
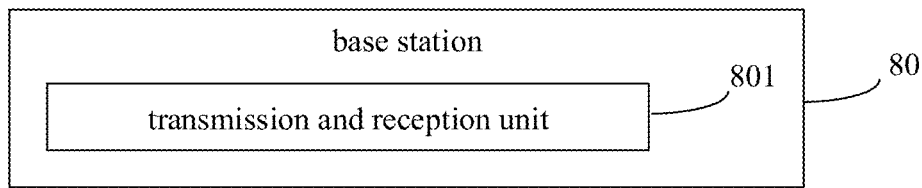
FIG. 8 is another schematic structural diagram of a base station according to embodiments of the present disclosure.

Exemplary embodiments of the present disclosure are described in more detail with reference to the accompanying drawings hereinafter. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Terms such as "first" and "second" in the specification and the claims of the present disclosure are used to distinguish similar objects and are not necessarily used to describe a specific order or sequence. It should be understood that the terms used in this way may be interchanged under appropriate circumstances, so that the embodiments of the present application described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent to the process, method, product, or device. The term "and/or" used in the specification and the claims indicates at least one of connected objects.

Technologies described in this specification are not limited to long term evolution (Long Time Evolution, LTE)/LTE-Advanced (LTE-Advanced, LTE-A) and NR systems, but may also be applied to various radio communications systems such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-Carrier Frequency-Division Multiple Access, SC-FDMA) and other systems. The terms "system" and "network" are often used interchangeably. The CDMA system may implement radio technologies such as CDMA2000 and universal terrestrial radio access (Universal Terrestrial Radio Access, UTRA). UTRA includes wideband CDMA (Wideband Code Division Multiple Access, WCDMA) and other variants of CDMA. The TDMA system may implement radio technologies such as global system for mobile communications (Global System for Mobile Communication, GSM). The OFDMA system may implement radio technologies such as ultra mobile broadband (Ultra Mobile Broadband, UMB), evolved UTRA (Evolution-UTRA, E-UTRA), IEEE 802.11 (Wi-Fi), IEEE 802.16 (WiMAX), IEEE 1102.20, and Flash-OFDM. UTRA and E-UTRA are parts of a universal mobile telecommunications system (Universal Mobile Telecommunications System, UMTS). LTE and more advanced LTE (such as LTE-A) are new UMTS versions using E-UTRA. UTRA, E-UTRA, UMTS, LTE, LTE-A, and GSM are described in documents from an organization named "3rd Generation Partnership Project" (3rd Generation Partnership Project, 3GPP). CDMA2000 and UMB are described in documents from an organization named "3rd Generation Partnership Project 2" (3GPP2). The technologies described in this specification may be used for the above systems and radio technologies, and may also be used for other systems and radio technologies. However, in the following descriptions, an NR system is described for an illustration purpose and NR terms are used in most of the following descriptions, although these technologies may also be applied to other applications than the NR system application.

Examples provided in the following descriptions are not intended to limit the scope, applicability, or configuration described in the claims. Functions and arrangements of discussed elements may be changed without departing from the spirit and scope of the present disclosure. Various examples may be omitted or replaced properly, or various procedures or components may be added. For example, the described method may be performed in an order different from the described order, and steps may be added, omitted, or combined. In addition, features described with reference to some examples may be combined in other examples.

In order to facilitate better understanding of this application, the related technologies that may be involved in this application are described the following.

Uplink analog beamforming (UL analog beamforming):
A user equipment (user equipment, UE) equipped with multiple antennas may perform analog beamforming on a transmission signal. For uplink transmission from the UE to a base station, an analog beam used to send an uplink signal may be obtained from an uplink signal or a downlink signal.

1) If correspondence of downlink (DL) and uplink (Uplink, UL) beams of the UE is met, the UE may obtain the optimal uplink transmission beam (UL Tx beam) by measuring a downlink reference signal. The UE may derive the UL Tx beam through a DL beam of the DL reference signal. The downlink reference signal used for obtaining the UL Tx beam may be pre-configured, configured through high layer signaling, or indicated to the UE through dynamic signaling. In the 5G system, the downlink reference signal used for obtaining the uplink transmission beam may be a channel state information reference signal (Channel state information Reference Signal, CSI-RS) or a synchronization signal/physical broadcast channel block (SS/PBCH block, SSB), where SS represents Synchronisation signal and PBCH represents Physical broadcast channel.

2) Regardless of whether correspondence between DL and UL beams is met, the base station may obtain the optimal uplink Tx beam of other uplink signals by measuring an UL reference signal sent by the UE. The UE may send a set of UL reference signals and different UL reference signals are beamformed through different transmission beams, then the base station can select the optimal uplink transmit beam for other uplink signals based on a measurement result by measuring these uplink reference signals. In the NR system, the base station configures in a semi-persistent manner or dynamically triggers a group of UL reference signal resources for the UE through signaling. The UE sends the UL reference signal according to the configuration of the base station. After receiving the uplink reference signal sent by the UE, the base station sends a reference signal resource indication (such as a reference signal resource number) to the UE. The UL Tx beam used by the UE to transmit the UL reference signal may be controlled by the base station, or selected by the UE and transparent to the base station. After the UE receives the UL reference signal indication from the base station, the UE may use, the Tx beam that transmits the reference signal corresponding to the UL reference signal resource indication, as a transmission beam of the uplink signal. In the 5G system, the reference signal that may be used for uplink transmission beam measurement is a sounding reference signal (Sounding Reference Signal, SRS).

Sounding Reference Signal (SRS):
   SRS is a reference signal used for uplink measurement. Before 5G systems, SRS was mainly used for uplink channel state information measurement for performing link adaptation. The first version of the 5G standard supports the following SRS features:
1) Multiple SRS resources form an SRS resource set. An SRS resource set configured for the UE indicates its usage through the high layer parameter "SRS-SetUse". The values may be configured for "SRS-SetUse" include "beam management", "codebook", "noncodebook", and "'antennaSwitching". When an SRS resource set is configured as "beam management", it may be used for UL beam training. An SRS resource set configured as "codebook" or "noncodebook" is mainly used for obtaining uplink CSI, or may be used for UL beam training. For ease of description, in the following, the SRS used for UL beam training is denoted as SRS BM. Each SRS resource may be configured with high layer signaling "SpatialRelationInfo". In the 3 GPP NR system, the "SpatialRelationInfo" of the SRS resource herein corresponds to the SRS-SpatialRelationInfo parameter in the high layer signaling SRS-Resource parameter in TS38.331. For the ease of presentation, "SpatialRelationInfo" is used to indicate spatial-related parameter information of a signal or a resource in this disclosure, which includes but not limited to SRS-SpatialRelationInfo, PUCCH-SpatialRelationInfo, QCL-Info and other parameters with similar functions in the 3GPP NR protocol, for indicating the transmission beam of the SRS.

Rel-15 supports the following UL beam management procedures:
   U1/U3
      All SRS resources in an SRS resource set with SRS-SetUse being configured as "beam management" are not configured with "SpatialRelationInfo"
      UL Tx beam is completely determined by UE
      For example, there is no prior beam information during initial beam training
   U2
      All SRS resources in an SRS resource set with SRS-SetUse being configured as "beam management" are configured with the same "SpatialRelationInfo"
      Scanning of the reception beam may be performed 2) SRS resources may be periodic, semi-persistent, or aperiodic. The transmission periods and offsets of periodic SRSs (P (Periodic) SRS) and semi-persistent SRSs (SP (Semi-persistent) SRS) are configured by high layer signaling. The 2-bit trigger field used to trigger the SRS in the downlink control information (Downlink Control Information, DCI) may be used to trigger an aperiodic SRS (AP (Aperiodic) SRS) to be transmitted in a slot. The four trigger states for triggering the AP SRS field are used to indicate: no SRS transmission, or transmitting the 1st/2nd/3rd SRS resource set. The offset of the AP-SRS is configured for each AP SRS resource set through high layer signaling, and corresponds to the trigger state.

3) Optionally, a UL Tx beam of a target SRS resource may be indicated by high layer signaling "SpatialRelationInfo". "SpatialRelationInfo" indicates a source reference signal (such as CSI-RS, or SSB, or SRS). The UE may use the indicated source reference signal to deduce the UL transmission beam of the target SRS. Source reference signals whose types are CSI-RS and SSB may only be configured for a UE for which correspondence of downlink and uplink beams is met, and a source reference signal whose type is SRS may be configured for any UE.

Beam management for PUSCH (Beam management for PUSCH)
   1) The UL Tx beam of PUSCH is indirectly indicated. For a PUSCH scheduled through a UL grant, it is assumed that the PUSCH uses the same transmission beam as an SRS resource indicated by a measurement reference signal resource indicator (SRS resource indicator, SRI) in the UL grant. The transmission beam of the PUSCH is the same as a transmission beam for the latest SRS transmission of the SRS resource indicated by the SRI in the UL grant DCI corresponding to the PUSCH before the terminal receiving the UL grant corresponding to the PUSCH.

For example, a PUSCH transmitted at time n is scheduled by a UL grant DCI (for example, DCI format 0_1) in a PDCCH, and an SRI contained in this DCI indicates a first SRS resource; then a transmission beam of the PUSCH transmitted at the time n is a transmission beam used by the latest SRS transmission corresponding to the first SRS resource before transmitting a PDCCH for a DCI for scheduling the PUSCH.

As shown in FIG. 1, it is assumed that PUSCH is codebook-based uplink transmission, and the base station configures an SRS resource set for codebook-based uplink transmission, which includes two SRS resources: SRS resource 0 and SRS resource 1. Time t1, . . . , t6 in the figure represents start time of data transmission. If the base station sends a PDCCH carrying UL grant DCI to the terminal at time t5, the SRI thereof indicates the SRS resource 0, and it schedules the PUSCH to start transmission at time t6, then, a beam of the PUSCH which starts to be transmitted at time t6 is the same as a transmission beam for transmitting the SRS at time t3.

In the NR system in the related technologies, for codebook-based uplink transmission, an SRS resource set used for CSI acquisition includes at most 2 SRS resources, and the SRI in the UL grant is used for indicating an SRS resource from the 2 SRS resources configured in the SRS resource set. In this case, the codebook-based uplink transmission supports beam selection between up to 2 UL transmission beams through SRI. For non-codebook uplink transmission, an SRS resource set used for CSI acquisition includes a maximum of 4 SRS resources, and the SRI in the UL grant is used for indicating one or more SRS resources from the 4 SRS resources configured in the SRS resource set. In this case, the codebook-based uplink transmission supports transmission in a maximum of 4 ULs through SRI.

Analog beamforming is mainly used in high frequency bands, such as a frequency band from 6 GHz to 52.6 GHz. This frequency band is usually called the millimeter wave band (mmWave band). Compared with a frequency band below 6 GHz, propagation loss in the high frequency range (caused by path loss, scattering, reflection, etc.) is more serious. Due to mobility and rotation of the UE, beam blocking between the transmitter and the receiver is more frequent. Therefore, it is needed to use flexible beam adjustment to adapt to rapidly changing of a propagation channel so as to ensure quality and robustness of beamforming.

The analog beamforming schemes supported by the 3GPP R15 version in the related technologies are relatively limited, and mainly have the following problems.

1. The UL Tx beam (for example, referring to the "SpatialRelationInfo" method) is configured for each SRS resource or for an SRS resource set in a semi-persistent manner, so it cannot be flexibly adjusted. When the UL transmission beam of an SRS resource needs to be changed, RRC reconfiguration is required. The latency of RRC reconfiguration is up to 100 to 200 ms. This will affect the performance of analog beamforming in latency-sensitive application scenarios.

2. The AP SRS trigger mechanism in the related technologies only supports 3 different SRS activation states (gNB may only activate one of the 3 AP SRS resource sets through DCI). Considering that the system may require a large quantity of SRS configurations for different purposes, this mechanism is very inflexible. For example, a hybrid beamforming system is taken in consideration. Then it needs at least two SRS resource sets for the codebook-based uplink transmission: the first SRS resource set is used for analog beamforming (for example, this SRS resource set may be configured as SRS-SetUse='beam management'), and the second SRS resource set is used for CSI acquisition (for example, this SRS resource set may be configured as SRS-SetUse='codebook'). The gNB needs to trigger the first SRS resource set to perform UL beam scanning to obtain the optimal UL transmission beam. Then the gNB configures "SpatialRelationInfo" for the second SRS resource set through the RRC configuration based on the result of the previous beam scanning. The gNB triggers the second SRS resource set for CSI acquisition. In this way, the base station needs to trigger the first SRS resource set in an aperiodic manner to search for a new UL Tx beam, and if a new beam is found, RRC reconfiguration is performed to reconfigure "SpatialRelationInfo" for the second SRS resource set. Repeating of this process will increase the frequency of RRC reconfiguration, which increases system latency, increases service interruption, and limits flexibility of beam adjustment.

3. The transmission beam of PUSCH is not explicitly indicated, and it uses the transmission beam for the latest SRS transmission of the SRS resource indicated by the SRI in the same scheduling grant. This adds unnecessary restrictions to the system. For example, the gNB schedules the first SRS in slot n, and schedules the second SRS in slot n+k, and PUSCH is sent in slot n+k+L, where k>0 and L>0. In the related technologies, for design of the NR system, it is stipulated that the PUSCH needs to use the same transmission beam as the latest SRS transmission of the SRS resource indicated by the SRI. This means that once a new SRS using a new beam is triggered, scheduling of the PUSCH cannot be performed until the process of acquiring CSI through the SRS using the new beam is finished. This will impose great restrictions on scheduling. A better system design needs to allow the PUSCH to use the transmission beam of earlier SRS transmission. In this way, when the gNB switches the SRS beam (and the latest CSI acquisition is not completed), the PUSCH may use the previous SRS beam to perform data transmission.

In view of the above problems, embodiments of the present disclosure provide a method for uplink beam indication, which can increase the flexibility of uplink beamforming and improve the efficiency of beam adjustment. Reference is made to FIG. 2, which shows a block diagram of a radio communication system to which embodiments of the present disclosure are applied. The radio communication system includes a terminal 21 and a base station 22. The terminal 21 may also be referred to as a user terminal or user equipment (User Equipment, UE). The terminal 21 may be a terminal-side device such as a mobile phone, a tablet computer (Tablet Personal Computer), a laptop computer (Laptop Computer), a personal digital assistant (Personal Digital Assistant, PDA), a mobile Internet device (Mobile Internet Device, MID), a wearable device (Wearable Device), or a vehicle-mounted device. It should be noted that a specific type of the terminal 21 is not limited in the embodiments of this disclosure. The base station 22 may be a 5G base station or a base station of a later version (for example, a gNB or a 5G NR NB), or a base station in another communications system (for example, an eNB, a WLAN access point, or another access point). The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a WLAN access point, a Wi-Fi node, or another appropriate term in the art. As long as the same technical effect is achieved, the base station is not limited to a specific technical term. It should be noted that only a base station in an NR system is used as an example in the embodiments of the present disclosure, but a specific type of the base station is not limited.

Under control of a base station controller, the base station 22 may communicate with the terminal 21. In various examples, the base station controller may be a part of the core network or some base stations. Some base stations may communicate control information or user data with the core network by using backhaul links. In some examples, some of these base stations may communicate with each other directly or indirectly by using backhaul links. The backhaul links may be wired or wireless communications links. The wireless communications system may support operations on multiple carriers (wave signals with different frequencies). A multi-carrier transmitter can transmit modulated signals on the multiple carriers. For example, each communications link may transmit multi-carrier signals modulated by using various radio technologies. Each modulated signal may be sent on different carriers and may carry control information (for example, a reference signal or a control channel), overhead information, data, and the like.

The base station 22 may perform wireless communication with the terminal 21 by using one or more access point antennas. Each base station may provide communication coverage for a corresponding coverage area of the base station. A coverage area of an access point may be divided into sectors each of which forming only a part of the coverage area. The wireless communications system may include different types of base stations (for example, a macro base station, a micro base station, or a picocell base station). The base station may also use different radio technologies, for example, a cell or WLAN radio access technology. The base station may be associated with same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communications link in the wireless communications system may include an uplink for carrying uplink (Uplink, UL) transmission (for example, from the terminal 21 to the base station 22) or a downlink for carrying downlink (Downlink, DL) transmission (for example, from the base station 22 to the terminal 21). UL transmission may also be referred to as reverse link transmission, and DL transmission may also be referred to as forward link transmission. A licensed frequency band, an unlicensed frequency band, or the both may be used for downlink transmission. Similarly, a licensed frequency band, an unlicensed frequency band, or the both may be used for uplink transmission.

Referring to FIG. 3, a method for uplink beam indication is provided by embodiments of the present disclosure. When being applied to the base station side, the method includes the following steps.

Step 31 includes: indicating by a base station dynamically, a transmission beam of a first uplink signal, to a terminal through transmission beam indication information. The first uplink signal includes at least one of: a sounding reference signal (SRS) or a signal transmitted on a physical uplink control channel (PUCCH).

In step 31, the base station may specifically indicate the transmission beam of the first uplink signal to the terminal through physical layer signaling such as DCI.

Through the above steps, the base station in the embodiments of the present disclosure can dynamically indicate the transmission beam of the first uplink signal to the terminal, without the need of adjusting the transmission beam of the signal such as the SRS or PUCCH through static or semi-static configuration by high layer signaling (such as an RRC message). In this way, the latency required for transmission beam adjustment is reduced, system performance is improved, and the performance of analog beamforming in latency-sensitive application scenarios is improved.

Referring to FIG. 4, embodiments of the present disclosure provide another method for uplink beam indication. When being applied to the base station side, the method includes the following steps.

Step 41 includes: indicating by a base station dynamically, a transmission beam of a first uplink signal, to a terminal through transmission beam indication information.

The first uplink signal is a signal transmitted on a physical uplink shared channel (PUSCH), the transmission beam indication information is used to indicate one or more reference signals from multiple candidate reference signals, the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

Optionally, the candidate reference signals include: the first reference signal, and, a reference signal other than the first reference signal. Optionally, the candidate reference signals only include reference signals other than the first reference signal.

For example, the first uplink signal is a PUSCH signal in a codebook-based transmission mode, and the uplink reference signal used for CSI acquisition for the first uplink signal is an SRS signal corresponding to an SRS resource in an SRS resource set whose usage is configured as 'codebook' by a high layer signaling; with the method of the embodiments, the base station may indicate another SRS signal to the terminal through the transmission beam indication information, the terminal determines the transmission beam of the PUSCH according to the SRS signal indicated by the transmission beam indication information, and it does not necessarily have to determine the transmission beam of the PUSCH according to the beam of the SRS signal corresponding to the SRS resource in the SRS resource set whose usage is configured as 'codebook'.

For another example, the first uplink signal is a PUSCH signal in a codebook-based transmission mode, the uplink reference signal used for CSI acquisition for the first uplink signal is two SRS resources {SRS 1, SRS 2} included in an SRS resource set whose usage is configured as 'codebook' by a high layer signaling, and the base station instructs the terminal to use SRS 1 to determine a precoding matrix of the PUSCH; with the method in the embodiments, the base station can indicate the SRS signal corresponding to SRS 2 to the terminal through the transmission beam indication information, so that the terminal determines the transmission beam of the PUSCH according to the beam of the SRS signal corresponding to SRS 2.

That is, a solution, in which the base station indicates, in a case that the first uplink signal is a PUSCH signal in a codebook-based transmission mode, the SRS signal corresponding to the SRS resource in the SRS resource set whose usage is configured as 'codebook' by the high layer signaling, to the terminal through the transmission beam indication information, so as to enable the terminal to determine the transmission beam of the PUSCH according to the beam of the SRS signal, is not excluded by the embodiments of the present invention.

The present invention is also applicable to scenarios where the first signal is a non-codebook PUSCH or a PUSCH in other transmission modes.

In step 41, the base station may specifically indicate the transmission beam of the first uplink signal to the terminal through physical layer signaling such as DCI.

It can be seen from the above step 41 that, when indicating the transmission beam corresponding to the PUSCH, the embodiments of the present disclosure may select a target reference signal from the candidate reference signals which include the reference signal other than the first reference signal, to indicate the transmission beam of the first reference signal. Compared with an implementation where the target reference signal is only selected from the first reference signal, the embodiments of the present disclosure can expand the selection range of uplink beamforming, increase the flexibility of uplink beamforming, and improve the efficiency of beam adjustment, thereby improving the performance of the communication system and enhancing the robustness of uplink transmission in scenarios such as mobility, rotation or blocking of the terminal.

In the process shown in FIG. 3, the first uplink signal includes at least one of the SRS or the signal on the PUCCH. In the process shown in FIG. 4, the first uplink signal refers to the signal on the PUSCH. That is, in the embodiments of the present disclosure, the first uplink signal may have different content in different scenarios. The content introduced in the following, unless otherwise specified, will be applicable to the application scenarios of FIG. 3 and FIG. 4. In addition, for ease of description, the signal transmitted on the PUSCH or the PUCCH is sometimes referred to as the PUSCH or the PUCCH for short.

The transmission beam indication information in step 31 or 41 in the embodiments of the present disclosure includes at least one of the following information:

a reference signal index of one or more reference signals among multiple candidate reference signals;

a reference signal identifier of one or more reference signals among multiple candidate reference signals; or, an index of one or more transmission beams among multiple candidate transmission beams.

In the embodiments of the present disclosure, the transmission beam indication information may be carried in physical layer signaling.

In the embodiments of the present disclosure, the transmission beam of the first uplink signal may be explicitly indicated by a predetermined field in the physical layer signaling. The predetermined field may be pre-defined by relevant standards, or pre-agreed by the base station and the terminal.

In the embodiments of the present disclosure, in the above step 31 or 41, the transmission beam indication information is used to indicate the transmission beam of the first uplink signal, and may specifically include indication information of the transmission beam of the first uplink signal. In some scenarios, the transmission beam indication information may be used to indicate transmission beams of other uplink signals; in this case, the transmission beam indication information may include indication information of a transmission beam of another uplink signal.

In the above step 31 or 41, indicating by the base station dynamically the transmission beam of the first uplink signal to the terminal may specifically include: indicating by the base station the transmission beam of the first uplink signal to the terminal through physical layer signaling, where the physical layer signaling carries indication information of the first uplink signal and indication information of the transmission beam of the first uplink signal. That is, the physical layer signaling includes not only the indication information of the transmission beam of the first uplink signal, but also the indication information of the first uplink signal to indicate the specific first uplink signal.

As an implementation manner, the indication information of the first uplink signal and the indication information of the transmission beam of the first uplink signal are respectively indicated by two independent fields in the physical layer signaling. As another implementation manner, the indication information of the first uplink signal and the indication information of the transmission beam of the first uplink signal are indicated by the same field in the physical layer signaling. The two independent fields or the same field may be pre-defined by relevant standards, or pre-agreed by the base station and the terminal.

In the embodiments of the present disclosure, there may be a pre-configured correspondence between a first uplink signal indicated by the indication information of the first uplink signal and a transmission beam indicated by the indication information of the transmission beam of the first uplink signal. The correspondence may be pre-configured by the base station to the terminal through high layer signaling, or may be agreed in related standards/protocols.

In a case that there is a pre-configured correspondence between the first uplink signal indicated by the indication information of the first uplink signal and the transmission beam indicated by the indication information of the transmission beam of the first uplink signal, the physical layer signaling carries the indication information of the first uplink signal and the indication information of the transmission beam of the first uplink signal. Specifically, it may carry one of the above two kinds of indication information, and the other kind of indication information may be carried in an implicit manner, that is, the other kind of indication information may be determined according to the one kind of indication information as carried and the correspondence.

In a case that there is a pre-configured correspondence between the first uplink signal indicated by the indication information of the first uplink signal and the transmission beam indicated by the indication information of the transmission beam of the first uplink signal, and if the same field in the physical layer signaling is used to indicate the above two kinds of indication information, a specific implementation may be as follows: each value of the same field indicates a kind of first uplink signal, first uplink signals indicated by different values may be the same or may be different, and each value has a pre-configured correspondence with the indication information of the transmission beam of the first uplink signal. In this case, the same value may indicate the same uplink signal, but different uplink transmission beams are used, so that the terminal can be dynamically instructed to use different transmission beams to send the same uplink signal, such as SRS resource. This implementation can make the base station do not need to change the uplink signal (such as SRS resource) when switching uplink analog beamforming, so it can allow the base station to configure fewer SRS resources, thereby simplifying cell planning of the network.

In the embodiments of the present disclosure, the indication information of the transmission beam of the first uplink signal may indicate one or more target transmission beams. As an implementation manner, when the indication information of the transmission beam of the first uplink signal only indicates one target transmission beam, the target transmission beam may be used for all signals indicated by the indication information of the first uplink signal. For example, the indication information of the first uplink signal indicates an SRS resource set (the first uplink signal is uplink signals corresponding to all SRS resources in this SRS resource set), the SRS resource set includes multiple SRS resources, and the indication information of the transmission beam of the first uplink signal only indicates a target transmission beam for one of the SRS resources, then, the target transmission beam is applicable to all SRS resources in the SRS resource set. For another example, the indication information of the first uplink signal indicates an SRS resource set (the first uplink signal is uplink signals corresponding to all SRS resources in the SRS resource set), the SRS resource set include multiple SRS resources, and the indication information of the transmission beam of the first uplink signal indicates a target transmission beam for the SRS resource set, then, the target transmission beam is applicable to all SRS resources in the SRS resource set.

As another implementation manner, there is a correspondence between a target transmission beam indicated by the indication information of the transmission beam of the first uplink signal and transmission beams of all signals included in the first uplink signal. The correspondence herein may be agreed in relevant standards/protocols, or may be determined by the base station and the terminal through interaction in advance. For example, the indication information of the first uplink signal indicates an SRS resource set (the first uplink signal is uplink signals corresponding to all SRS resources in the SRS resource set), the SRS resource set includes multiple SRS resources, the indication information of the transmission beam of the first uplink signal only indicates a target transmission beam for one of the SRS resources, and transmission beams of other SRS resources has a correspondence with the transmission beam of the SRS resource whose transmission beam has been indicated by the indication information of the transmission beam of the first uplink signal, then, the transmission beams of the other SRS resources may be determined according to the correspondence.

In the embodiments of the present disclosure, the indication information of the first uplink signal is trigger information for the first uplink signal. Specifically, for an aperiodic uplink signal, the indication information of the first uplink signal may be specific trigger information. For example, for an SRS resource, the indication information of the first uplink signal may be trigger information for the SRS resource, that is, the SRS resource triggered by the trigger information is the first uplink signal. For a periodic or semi-persistent uplink signal, the embodiments of the present disclosure may use special indication information (that is, the indication information of the first uplink signal) to indicate which periodic or semi-persistent signal is the first uplink signal. A semi-persistent signal represents that the period of the signal may be adjusted semi-statically, for example, the period of the signal is adjusted as required, and the signal is sent periodically between two adjustments of the period.

In the above-mentioned step 31 or 41 in the embodiments of the present disclosure, in addition to carrying the indication information of the transmission beam of the first uplink signal in the physical layer signaling, indication information of a transmission beam of another uplink signal may also be carried. Specifically, the physical layer signaling carries: first beam indication information used to indicate the transmission beam of the first uplink signal, and second beam indication information used to indicate a transmission beam of a second uplink signal. Optionally, the physical layer signaling may also carry first signal indication information for indicating the first uplink signal and/or second signal indication information for indicating the second uplink signal.

Some feasible indication manners for indicating the first signal indication information of the first uplink signal include: an index of a reference signal resource corresponding to the first signal, or an identifier of a reference signal corresponding to the first signal, etc. For example, the first signal is an SRS signal, the first signal indication information is SRS resource indication information for indicating one SRS resource from an SRS resource set, and the first signal indicated by the first signal indication signal is one or more SRS corresponding to the SRS resource indicated by the SRS resource indication information. For another example, the first signal is an SRS signal, the first signal indication information is SRS resource set indication information for indicating one SRS resource set from multiple SRS resource sets, and the first signal indicated by the first signal indication signal is one or more SRS corresponding to the SRS resources included in the SRS resource set indicated by the SRS resource set indication information.

Furthermore, the physical layer signaling may carry third beam indication information used to indicate a transmission beam of a third uplink signal, and even carry fourth beam indication information used to indicate a transmission beam of a fourth uplink signal. For example, the first uplink signal may be an SRS, the second uplink signal is a signal transmitted on a PUSCH, and the third uplink signal is a signal transmitted on a PUCCH, or, the first uplink signal is an SRS, the second uplink signal is a signal transmitted on a PUSCH, and the third signal is another signal transmitted on the PUSCH.

In addition, as an implementation manner, the physical layer signaling may only include the indication information of the transmission beam, and in this case, the specific uplink signal may be indicated by another signaling, or agreed in advance through related protocols/standards. As another implementation manner, the physical layer signaling may only include the indication information of the uplink signal, and the transmission beam of the uplink signal may be indicated by another signaling, or agreed in advance through related protocols/standards. As yet another implementation manner, the physical layer signaling may include both the indication information of the transmission beam and the indication information of the uplink signal. It should be noted that the indication information of the transmission beam of the first uplink signal and the indication information of the transmission beam of the second uplink signal may be sent in the same physical signaling, or may be sent in two physical layer signalings, which is not limited in the present disclosure.

As an optional implementation, the first uplink signal may be an SRS or a PUCCH, or a PUSCH, and the second uplink signal may include at least one of SRS, a signal transmitted on a PUSCH, or a signal transmitted on a PUCCH. For example, the first uplink signal is an SRS, and the second uplink signal is a PUSCH. For example, the first uplink signal is an SRS that is used for uplink CSI acquisition and is corresponding to a PUSCH, and the second uplink signal is the PUSCH. Taking a PUSCH whose transmission mode is codebook-based uplink transmission as an example, according to the 3GPP protocol, the parameter txConfig in the high layer parameter PUSCH-Config is configured as 'codebook' (for a PUSCH of non-codebook uplink transmission, it is configured as 'nonCodebook'), and the first uplink signal is an SRS signal corresponding to the SRS resource included in the SRS resource set whose usage in the high layer parameter SRS-ResourceSet is configured as 'codebook' (or 'nonCodebook'). When the second signal is a PUSCH, the first signal may be an SRS used for beam management, for example, an SRS signal corresponding to the SRS resource included in the SRS resource set whose usage in the high layer parameter SRS-ResourceSet is configured as 'codebook' (or 'nonCodebook').

Optionally, the first uplink signal is an SRS, and the second uplink signal is a PUCCH.

When the physical layer signaling carries the first beam indication information and the second beam indication information, as an optional implementation manner, the first beam indication information and the second beam indication information may be indicated by a joint coding field in the physical layer signaling, and the value of the joint coding field is obtained by joint coding the first beam indication information and the second beam indication information. The parameter obtained by joint coding may indicate both the first beam indication information and the second beam indication information.

When the physical layer signaling carries the first beam indication information and the second beam indication information, as another optional implementation manner, the first beam indication information and the second beam indication information may be respectively indicated by two independent information fields in the physical layer signaling.

As an optional implementation manner, the physical layer signaling indicates both the transmission beam of the first uplink signal and the transmission beam of the third uplink signal, where the physical layer signaling includes a first information field, the first information field is used to indicate the first beam indication information, and there is a mapping relationship between the transmission beam of the first uplink signal and the transmission beam of the third uplink signal. For example, when the transmission beams of the SRS and the PUSCH need to be indicated, the transmission beam of the SRS may be indicated in the first information field, in this case, the transmission beam of the PUSCH may be derived from the transmission beam of the SRS and the mapping relationship. For another example, when the transmission beams of the SRS and the PUSCH need to be indicated, the transmission beam of the PUSCH may be indicated in the first information field, in this case, the transmission beam of the SRS may be derived from the transmission beam of the PUSCH and the mapping relationship. Specifically, which signal has its transmission beam being indicated in the first information field may be selected according to a predetermined strategy. For example, the transmission beam of the SRS is indicated in the first information field in some scenarios, and the transmission beam of the PUSCH is indicated in the first information field in other scenarios. In the embodiments of the present disclosure, when the transmission beams of the SRS and the PUSCH need to be indicated, the first information field may always be used to indicate the transmission beam of the SRS, or, the first information field may always be used to indicate the transmission beam of the PUSCH.

Optionally, the first uplink signal and the second uplink signal each are a signal from the SRS and the signal transmitted on the PUSCH. For example, the first uplink signal is the SRS and the second uplink signal is the signal transmitted on the PUSCH, or, the first uplink signal is the signal transmitted on the PUSCH and the second uplink signal is the SRS.

Optionally, in the embodiments of the present disclosure, when the first uplink signal in the above step 31 or 41 includes the signal transmitted on the PUSCH, the physical layer signaling may include indication information of an SRS resource set corresponding to the PUSCH. For example, when multiple SRS resource sets are allowed to be configured for the PUSCH, the indication of SRS resource set may be performed in the above manner. The indication information of the SRS resource set corresponding to the PUSCH implicitly indicates the transmission beam. On the terminal side, the terminal may use the indication information of the above SRS resource set to determine the transmission beam.

Optionally, in the embodiments of the present disclosure, when the first uplink signal in the above step 31 or 41 includes the signal transmitted on the PUSCH, the transmission beam indication information may include indication information of an SRS transmission corresponding to the PUSCH. The indication information of the SRS transmission corresponding to the PUSCH may be used to indicate the transmission beam to the terminal.

The indication information of the SRS transmission corresponding to the PUSCH may include N values, and there is a one-to-one correspondence between each of the N values and an SRS transmission from latest N transmissions of an SRS resource performed by the terminal before DCI transmission time. In this way, the specific SRS transmission referenced by the transmission beam may be determined according to the above correspondence.

Optionally, in the method for transmission beam indication in the embodiments of the present disclosure, the base station may instruct the terminal to send the first uplink signal. The base station may instruct the terminal to send the first uplink signal before the above step 31 or 41, or, the base station may instruct the terminal to send the first uplink signal after the above step 31 or 41. Or, the base station may further instruct the terminal to send the first uplink signal in the above step 31 or 41. After the above step 31 or 41, the base station may receive the first uplink signal by using a reception beam corresponding to the transmission beam indication information.

Optionally, in a case that there is a mapping relationship between the transmission beam of the first uplink signal and the transmission beam of the second uplink signal, the physical layer signaling includes a first information field, and the first information field is used to indicate the first beam indication information, the base station may further instruct the terminal to send the first uplink signal and the second uplink signal in the method for transmission beam indication in embodiments of the present disclosure. The instructing may be performed before or after step 31 or 41, or in step 31 or 41. After the above step 31 or 41, the base station may determine the reception beams of the first uplink signal and the second uplink signal according to the transmission beam indicated by the first information field and the mapping relationship, and receive the first uplink signal and the third uplink signal by using the reception beams.

The method for transmission beam indication according to the embodiments of the present disclosure is described from the base station side in the above. Embodiments of the present disclosure are further described from the terminal side in the following.

Reference is made to FIG. 5, which shows the method for transmission beam indication provided by the embodiments of the present disclosure. When being applied to the terminal side, the method includes: step 51 and step 52.

Step 51 includes: receiving signaling information sent by a base station dynamically, where the signaling information includes transmission beam indication information used to indicate a transmission beam of a first uplink signal.

The first uplink signal includes at least one of: a sounding reference signal (SRS) or a signal transmitted on a physical uplink control channel (PUCCH). The signaling information may specifically be physical layer signaling such as DCI.

Step 52 includes: determining the transmission beam of the first uplink signal according to the signaling information.

Through the above steps, the terminal in the embodiments of the present disclosure can receive the transmission beam of the first uplink signal dynamically indicated by the base station, without the need of obtaining, through high layer signaling (such as an RRC (Radio Resource Control) message), the transmission beam of the signal such as the SRS or PUCCH that is configured by the base station in a static or semi-static manner. In this way, the latency required for transmission beam adjustment is reduced, system performance is improved, and the performance of analog beamforming in latency-sensitive application scenarios is improved.

Reference is made to FIG. 6, which shows the method for transmission beam indication provided by the embodiments of the present disclosure. When being applied to the terminal side, the method includes:

Step 61 includes: receiving signaling information sent by a base station dynamically, where the signaling information includes transmission beam indication information used to indicate a transmission beam of a first uplink signal.

The first uplink signal is a signal transmitted on a physical uplink shared channel (PUSCH), the transmission beam indication information is used to indicate an index of one or more reference signals from multiple candidate reference signals, the candidate reference signals include a reference signal other than a first reference signal, and the first reference signal is a reference signal corresponding to an uplink reference signal resource that is configured by the base station for a terminal and is used for acquiring channel state information (CSI) in an uplink transmission mode corresponding to the PUSCH. The signaling information may specifically be physical layer signaling such as DCI.

Optionally, the candidate reference signals include: the first reference signal, and a reference signal other than the first reference signal.

Optionally, the candidate reference signals only include a reference signal other than the first reference signal.

Step 62 includes: determining the transmission beam of the first uplink signal according to the signaling information.

Through the above steps, when acquiring the transmission beam corresponding to the PUSCH, the terminal in the embodiments of the present disclosure may select a target reference signal from the candidate reference signals which include the reference signal other than the first reference signal, to indicate the transmission beam of the first reference signal. Compared with an implementation where the target reference signal is only selected from the first reference signal, the embodiments of the present disclosure can expand the selection range of uplink beamforming, increase the flexibility of uplink beamforming, and improve the efficiency of beam adjustment, thereby improving the performance of the communication system and enhancing the robustness of uplink transmission in scenarios such as mobility, rotation or blocking of the terminal.

For example, the first uplink signal is a PUSCH signal in a codebook-based transmission mode, and the uplink reference signal used for CSI acquisition for the first uplink signal is an SRS signal corresponding to an SRS resource in an SRS resource set whose usage is configured as 'codebook' by a high layer signaling; with the method of the embodiments, the base station may indicate another SRS signal to the terminal through the signaling information, and the terminal determines the transmission beam of the PUSCH signal according to the SRS signal indicated by the signaling information, and it does not necessarily have to determine the transmission beam of the PUSCH according to the beam of the SRS signal corresponding to the SRS resource in the SRS resource set whose usage is configured as 'codebook'.

For another example, the first uplink signal is a PUSCH signal in a codebook-based transmission mode, the uplink reference signal used for CSI acquisition for the first uplink signal is two SRS resources {SRS 1, SRS 2} included in an SRS resource set whose usage is configured as 'codebook' by high layer signaling, and the base station instructs the terminal to use SRS 1 to determine a precoding matrix of the PUSCH; with the method in the embodiments, the base station can indicate the SRS signal corresponding to SRS 2 to the terminal through the signaling information, so that the terminal determines the transmission beam of the PUSCH according to the SRS signal corresponding to SRS 2. After receiving the signaling information, the terminal determines the transmission beam of the PUSCH according to the beam of the SRS signal corresponding to SRS 2.

That is, a solution, in which the base station indicates, in a case that the first uplink signal is a PUSCH signal in a codebook-based transmission mode, the SRS signal corresponding to the SRS resource in the SRS resource set whose usage is configured as 'codebook' by the high layer signaling, to the terminal through the signaling information, so as to enable the terminal to determine the transmission beam of the PUSCH according to the beam of the SRS signal, is not excluded by the embodiments of the present invention.

The present invention is also applicable to scenarios where the first signal is a non-codebook PUSCH or a PUSCH in other transmission modes.

In the process shown in FIG. 5, the first uplink signal includes at least one of the SRS or the signal on the PUCCH. In the process shown in FIG. 6, the first uplink signal refers to the signal on the PUSCH. That is, in the embodiments of the present disclosure, the first uplink signal may have different content in different scenarios. The content introduced in the following, unless otherwise specified, will be applicable to the application scenarios of FIG. 5 and FIG. 6.

The signaling information dynamically transmitted in step 51 or 61 in the embodiments of the present disclosure includes the transmission beam indication information, and the transmission beam indication information is used to indicate the transmission beam of the first uplink signal. Specifically, the transmission beam indication information includes at least one of the following information:

a reference signal index of one or more reference signals among multiple candidate reference signals;

a reference signal identifier of one or more reference signals among multiple candidate reference signals; or, an index of one or more transmission beams among multiple candidate transmission beams.

In the embodiments of the present disclosure, the transmission beam indication information may be carried in physical layer signaling.

In the embodiments of the present disclosure, in the above step 51 or 61, the transmission beam indication information is used to indicate the transmission beam of the first uplink signal, and may specifically include indication information of the transmission beam of the first uplink signal. In some scenarios, the transmission beam indication information may be used to indicate transmission beams of other uplink signals; in this case, the transmission beam indication information may include indication information of a transmission beam of another uplink signal.

In the embodiments of the present disclosure, the transmission beam of the first uplink signal may be explicitly indicated by a predetermined field in the physical layer signaling. The predetermined field may be pre-defined by relevant standards, or pre-agreed by the base station and the terminal.

In the above step 51 or 61, the terminal may receive physical layer signaling and determine the transmission beam of the first uplink signal indicated by the base station. The physical layer signaling carries indication information of the first uplink signal and indication information of the transmission beam of the first uplink signal. The physical layer signaling includes not only the indication information of the transmission beam of the first uplink signal, but also the indication information of the first uplink signal to indicate the specific first uplink signal.

As an implementation manner, the indication information of the first uplink signal and the indication information of the transmission beam of the first uplink signal are respectively indicated by two independent fields in the physical layer signaling. In this case, in the above step 52 or 62, the terminal may obtain the first uplink signal and the transmission beam of the first uplink signal respectively from the two independent fields in the physical layer signaling.

As another implementation manner, the indication information of the first uplink signal and the indication information of the transmission beam of the first uplink signal are indicated by the same field in the physical layer signaling. In this case, in the above step 52 or 62, the terminal may obtain the first uplink signal and the transmission beam of the first uplink signal from the same field in the physical layer signaling.

The two independent fields or the same field may be pre-defined by relevant standards, or pre-agreed by the base station and the terminal.

In the embodiments of the present disclosure, there may be a pre-configured correspondence between a first uplink signal indicated by the indication information of the first uplink signal and a transmission beam indicated by the indication information of the transmission beam of the first uplink signal. The correspondence may be pre-configured by the base station to the terminal through high layer signaling, or may be agreed in related standards/protocols.

In a case that there is a pre-configured correspondence between the first uplink signal indicated by the indication information of the first uplink signal and the transmission beam indicated by the indication information of the transmission beam of the first uplink signal, the physical layer signaling carries the indication information of the first uplink signal and the indication information of the transmission beam of the first uplink signal. Specifically, it may carry one of the above two kinds of indication information, and the other kind of indication information may be carried in an implicit manner, that is, in the above step 52 or 62, the other kind of indication information may be determined by the terminal according to the one kind of indication information as carried in the physical layer signaling and the correspondence.

For example, in the same field in the physical layer signaling, the first uplink signal indicated by the indication information of the first uplink signal has a pre-configured correspondence with the transmission beam indicated by the indication information of the transmission beam of the first uplink signal in the same field; in this case, in the above step 52 or 62, the terminal may obtain one of: the first uplink signal or the transmission beam of the first uplink signal, from the same field in the physical layer signaling; and then determine, according to the pre-configured correspondence, the other kind corresponding to the one kind.

In a case that there is a pre-configured correspondence between the first uplink signal indicated by the indication information of the first uplink signal and the transmission beam indicated by the indication information of the transmission beam of the first uplink signal, and if the same field in the physical layer signaling is used to indicate the above two kinds of indication information, a specific implementation may be as follows: each value of the same field indicates a kind of first uplink signal, first uplink signals indicated by different values may be the same or may be different, and each value has a pre-configured correspondence with the indication information of the transmission beam of the first uplink signal. In this case, the same value may indicate the same uplink signal, but different uplink transmission beams are used, so that the terminal can be dynamically instructed to use different transmission beams to send the same uplink signal, such as SRS resource. This implementation can make the base station do not need to change the uplink signal (such as SRS resource) when switching uplink analog beamforming, so it can allow the base station to configure fewer SRS resources, thereby simplifying cell planning of the network.

In the embodiments of the present disclosure, the indication information of the transmission beam of the first uplink signal may indicate one or more target transmission beams. As an implementation manner, when the indication information of the transmission beam of the first uplink signal only indicates one target transmission beam, in the above step 52 or 62, the terminal may determine the target transmission beam as a transmission beam of all uplink signals included in the first uplink signal. As another implementation manner, there is a correspondence between a target transmission beam indicated by indication information of the transmission beam of the first uplink signal and a transmission beams of all signals included in the first uplink signal, in this case, in the above step 52 or 62, the terminal may determine the target transmission beam corresponding to each signal included in the first uplink signal, according to the target transmission beam and the correspondence. The correspondence herein may be agreed in relevant standards/protocols, or may be determined by the base station and the terminal through interaction in advance.

In the embodiments of the present disclosure, the indication information of the first uplink signal is trigger information for the first uplink signal. Specifically, for an aperiodic uplink signal, the indication information of the first uplink signal may be specific trigger information. For example, for an SRS resource, the indication information of the first uplink signal may be trigger information for the SRS resource, that is, the SRS resource triggered by the trigger information is the first uplink signal. For a periodic or semi-persistent uplink signal, the embodiments of the present disclosure may use special indication information (that is, the indication information of the first uplink signal) to indicate which periodic or semi-persistent signal is the first uplink signal.

In the above step 51 or 61 in the embodiments of the present disclosure, in addition to carrying the indication information of the transmission beam of the first uplink signal in the physical layer signaling, indication information of a transmission beam of another uplink signal may also be carried. Specifically, the physical layer signaling carries: first beam indication information used to indicate the transmission beam of the first uplink signal, and second beam indication information used to indicate a transmission beam of a second uplink signal. Optionally, the physical layer signaling may also carry first signal indication information for indicating the first uplink signal and/or second signal indication information for indicating the second uplink signal.

Further, the physical layer signaling may also carry third beam indication information of the transmission beam of the third uplink signal, and even fourth beam indication information of the transmission beam of the fourth uplink signal. For example, the first uplink signal may be an SRS, the second uplink signal is a signal transmitted on a PUSCH, and the third uplink signal is a signal transmitted on a PUCCH, or, the first uplink signal is an SRS, the second uplink signal is a signal transmitted on a PUSCH, and the third signal is another signal transmitted on the PUSCH.

In addition, as an implementation manner, the physical layer signaling may only include the indication information of the transmission beam, and in this case, the specific uplink signal may be indicated by another signaling, or agreed in advance through related protocols/standards. As another implementation manner, the physical layer signaling may only include the indication information of the uplink signal, and the transmission beam of the uplink signal may be indicated by another signaling, or agreed in advance through related protocols/standards. As yet another implementation manner, the physical layer signaling may include both the indication information of the transmission beam and the indication information of the uplink signal. It should be noted that the indication information of the transmission beam of the first uplink signal and the indication information of the transmission beam of the second uplink signal may be sent in the same physical signaling, or may be sent in two physical layer signalings, which is not limited in the present disclosure.

As an optional implementation, the first uplink signal may be an SRS or a PUCCH, or a PUSCH, and the second uplink signal may include at least one of SRS, a signal transmitted on a PUSCH, or a signal transmitted on a PUCCH.

When the physical layer signaling carries the first beam indication information and the second beam indication information, as an optional implementation manner, the first beam indication information and the second beam indication information may be indicated by a joint coding field in the physical layer signaling, and the value of the joint coding field is obtained by joint coding the first beam indication information and the second beam indication information. The parameter obtained by joint coding may indicate both the first beam indication information and the second beam indication information. In this case, in the above step 52 or 62, the terminal may obtain the first beam indication information and the second beam indication information respectively from the joint coding field in the physical layer signaling, so as to obtain the transmission beam of the first uplink signal and the transmission beam of the second uplink signal.

When the physical layer signaling carries the first beam indication information and the second beam indication information, as another optional implementation manner, the first beam indication information and the second beam indication information may be respectively indicated by two independent information fields in the physical layer signaling. In this case, in the above step 52 or 62, the terminal may obtain the first beam indication information and the second beam indication information respectively from the two independent information fields in the physical layer signaling, so as to obtain the transmission beam of the first uplink signal and the transmission beam of the second uplink signal.

As an optional implementation manner, the physical layer signaling indicates both the transmission beam of the first uplink signal and the transmission beam of the third uplink signal, where the physical layer signaling includes a first information field, the first information field is used to indicate the first beam indication information, and there is a mapping relationship between the transmission beam of the first uplink signal and the transmission beam of the third uplink signal. In this case, in the above step 52 or 62, the terminal may obtain the transmission beam of the first uplink signal from the first information field in the physical layer signaling; after receiving the signaling information sent by the base station dynamically, the terminal may determine the transmission beam of the third uplink signal corresponding to the transmission beam of the first uplink signal according to the transmission beam of the first uplink signal and the mapping relationship.

Optionally, the first uplink signal and the second uplink signal each are a signal from the SRS and the signal transmitted on the PUSCH. For example, the first uplink signal is the SRS and the second uplink signal is the signal transmitted on the PUSCH, or, the first uplink signal is the signal transmitted on the PUSCH and the second uplink signal is the SRS.

Optionally, in the embodiments of the present disclosure, when the first uplink signal in the above step 51 or 61 includes the signal transmitted on the PUSCH, the physical layer signaling may include indication information of an SRS resource set corresponding to the PUSCH. For example, when multiple SRS resource sets are allowed to be configured for the PUSCH, the indication of SRS resource set may be performed in the above manner. The indication information of the SRS resource set corresponding to the PUSCH implicitly indicates the transmission beam. In this case, in step 52 or 62, the terminal determines the SRS resource set corresponding to the PUSCH according to the indication information of the SRS resource set corresponding to the PUSCH, and uses the determined SRS resource set to determine the transmission beam of the first uplink signal.

Optionally, in the embodiments of the present disclosure, when the first uplink signal in the above step 51 or 61 includes the signal transmitted on the PUSCH, the transmission beam indication information may include indication information of an SRS transmission corresponding to the PUSCH. The indication information of the SRS transmission corresponding to the PUSCH may be used to indicate the transmission beam to the terminal.

The indication information of the SRS transmission corresponding to the PUSCH may include N values, and there is a one-to-one correspondence between each of the N values and an SRS transmission from latest N transmissions of an SRS resource performed by the terminal before DCI transmission time. In this way, in the step 52 or 62, the terminal may determine the SRS transmission corresponding to the value according to the value of the indication information of the SRS transmission; and determine the transmission beam of the signal transmitted on the PUSCH according to the transmission beam used for the determined SRS transmission.

Optionally, in the method for transmission beam indication in the embodiments of the present disclosure, the terminal may receive indication information that is sent by the base station and is used for instructing the terminal to send the first uplink signal; the indication information may be indicated before or after step 51 or 61, or may be indicated in step 51 or 61. In this way, after the above step 52 or 62, the terminal may use the determined transmission beam of the first uplink signal to send the first uplink signal.

Optionally, in the method for transmission beam indication in the embodiments of the present disclosure, the terminal may receive indication information that is sent by the base station and is used for instructing the terminal to send the first uplink signal and the third uplink signal; after determining the transmission beams of the first uplink signal and the third uplink transmission signal, the terminal may use the determined transmission beams of the first uplink signal and the third uplink transmission signal to transmit the first uplink signal and the third uplink signal.

The method for transmission beam indication according to the embodiments of the present disclosure is described in the above. Further descriptions are provided hereinafter in conjunction with specific embodiments.

In the following embodiments, the first uplink signal and the second uplink signal are the SRS and the PUSCH respectively. It should be noted that the above specific signals are only examples for illustration, and the first uplink signal and the second uplink signal in the embodiments of the present disclosure may be other signals such as PUCCH and PUSCH, respectively, which is not further listed for description.

In an embodiment, the quantity of SRS resources allowed to be configured in the SRS resource set used for CSI acquisition may be expanded from 2 to a larger value. For example, in this way, the bit width of the SRI field in the UL grant needs to be increased accordingly, such as increasing to 3 bit. Similar to the design in the 3GPP R15 version, high layer signaling configures a spatial-related parameter for each SRS resource to indicate the reference signal used for determining the transmission beam of the SRS transmission corresponding to the SRS resource (for example, in the R15 NR system, configuration may be performed through "SpatialRelationInfo"). By increasing the quantity of the SRS resources in the SRS resource set used for CSI acquisition, the base station may configure different spatial-related parameters for different SRS resources, thereby allowing PUSCH transmission to perform selection among more beams. The advantage of this scheme is that the SRS trigger and the bit width of the SRS trigger field in the DCI can remain unchanged. More flexible beam selection is achieved by configuring a larger quantity of SRS resources using different UL Tx beams. The disadvantage of this scheme is that the SRS used for CSI acquisition usually has a larger overhead than the SRS used for beam management. This is due to the fact that: for the SRS used for beam management, each resource usually needs to support multiple SRS ports to allow multiple input multiple output (Multiple Input Multiple Output, MIMO) operations; and for the SRS used for beam management, only a single antenna port is usually needed. Therefore, increasing the quantity of SRS resources used for CSI acquisition may result in increased SRS overhead.

In another implementation manner, the bit width of the SRS trigger field is increased. For example, in the R15 NR system, the SRS trigger field is indicated by the SRS request field in the DCI, which is 2 bits. The SRS request field is increased from 2 bits to 3 bits. This allows the gNB to perform SRS resource set trigger from a maximum of 7 SRS resource sets based on scheduling requirements. In this way, the gNB can select and receive different SRS for different services, thereby providing better flexibility for the configuration of the gNB. Similar to the design of R15 in the related technologies, the spatial parameter (for convenience, it is represented by SpatialRelationInfo hereinafter) used for indicating the transmission beam reference for determining the SRS transmission corresponding to the SRS resource is configured for each SRS resource through high layer signaling. For example, when each SRS resource set has only a small quantity of SRS resources to limit system overhead, different SRS resources may be configured with different SpatialRelationInfo to achieve flexible beam switching. Compared with the previous embodiment, this manner can achieve the same flexibility of beam switching and scheduling while having a smaller system overhead.

In another embodiment, a state of the SRS trigger filed is allowed to trigger multiple SRS resource sets. If the base station may configure multiple SRS resource sets for the terminal in a certain uplink transmission mode, and different SRS resource sets correspond to different "SpatialRelationInfo", the base station may use these SRS resource sets to perform beam scanning. In this case, an SRS resource set indicator needs to be added to the UL grant, to indicate the SRS resource set corresponding to PUSCH transmission. The SRI is the SRS resource indicator in the SRS resource set indicated by the SRS resource set indicator. Optionally, the SRS resource set indication field reuses the SRI field in the UL grant. When the quantity of the SRS resource sets in a certain uplink transmission mode configured by the base station for the terminal is more than 1, and each SRS resource set contains only one SRS resource, the SRI field is used to indicate the SRS resource set in this transmission mode; when the quantity of SRS resource set in a certain uplink transmission mode configured for the terminal is 1 and it includes multiple SRS resources, the SRI field is used to indicate the SRS resource in the SRS resource set in this transmission mode.

In a first optional embodiment of the present disclosure:
1) The uplink transmission beam of the SRS is dynamically and explicitly indicated through signaling.
2) The beam of the PUSCH adopts the design of Rel15, that is, the uplink transmission beam of the PUSCH adopts a transmission beam of the latest SRS transmission of the SRS resource corresponding to the SRI indicated in its scheduling grant (grant).

As an implementation of the above first optional embodiment, "SpatialRelationInfo" is no longer configured for each SRS resource through RRC signaling, but is dynamically and explicitly configured as an independent control field in DCI. "SpatialRelationInfo" provides, for the target reference signal, information used to indicate the uplink transmission beam (for example, indicating to the target reference signal the reference signal CSI-RS/SSB/SRS used to determine the uplink transmission beam). In this way, the uplink transmission beam can be dynamically and explicitly indicated. In general, SRS triggering is allowed to include two independent fields, for example, an SRS trigger field and a UL Tx beam indication field. The SRS trigger field indicates the triggered SRS resource or SRS resource set, and the UL Tx beam indication field (for example, the SpatialRelationInfo indication field) is used to indicate the uplink transmission beam of the triggered SRS resource or SRS resource set.

Optionally, "SpatialRelationInfo" is indicated by the SRS trigger field. The trigger state of the SRS resource/SRS resource set includes "SpatialRelationInfo" information of the SRS resource. The "SpatialRelationInfo" information of the SRS resource triggered by the trigger state of the SRS resource/SRS resource set may be configured through RRC signaling. For example, SRS trigger state 0 and SRS trigger state 1 in the SRS trigger field in DCI both trigger SRS resource 0; through RRC signaling, the SpatialRelationInfo information of SRS resource 0 triggered by SRS trigger state 0 may be configured as SpatialRelationInfo 1 and the SpatialRelationInfo information of SRS resource 0 triggered by SRS trigger state 2 may be configured as SpatialRelationInfo 2. Through different SRS trigger states in the DCI, the UE can be dynamically instructed to use different SpatialRelationInfo to send the same SRS resource.

The advantage of this scheme is that, it allows the gNB to switch uplink analog beamforming without changing the SRS resource, thereby allowing the base station to configure fewer SRS resources. This can simplify the cell planning of the network.

The bit width of "SpatialRelationInfo" may be selected based on a balance between sufficient beam change flexibility and DCI overhead. For example, 3 bit may be used, which allows beam selection from 8 candidate UL Tx beams.

It is noted that different trigger states of an SRS resource set including multiple SRS resources may trigger different quantities of SRS resources. In this case, it needs to be determined how the beam indicated by the "SpatialRelationInfo" field is applied to different quantities of SRS resources.

Optionally, each "SpatialRelationInfo" only indicates one beam (for example, indicating a reference CSI-RS/SSB/SRS), and this beam is used for all triggered SRS resources.

Optionally, each "SpatialRelationInfo" indicates a group of beams (for example, indicating multiple references CSI-RS/SSB/SRS). A beam corresponding to a "SpatialRelationInfo" indication state may be fixed or pre-configured. How the indicated beam is used for the triggered SRS resource may be a predefined manner. For example, the simplest manner is that the beam indicated by "SpatialRelationInfo" has a one-to-one mapping relationship with the SRS resource triggered by the SRS trigger state.

In a second optional embodiment of the present disclosure:
1) The transmission beams of the SRS and the PUSCH are both dynamically and explicitly indicated through signaling.
2) The beams of the SRS and the PUSCH are independently indicated.

As a derivative of the above second optional embodiment, the transmission beams of the SRS and the PUSCH are jointly indicated, the same indicated beam is used for both the SRS and the PUSCH; or, an indicated beam is used for the SRS (or the PUSCH), and a second beam that has a predefined relationship with the indicated beam is used for the PUSCH (or the SRS)).

As an implementation of the above second optional embodiment, the SRS and the PUSCH are respectively defined with different "SpatialRelationInfo" signaling fields. Specifically:

UL grant: the UL grant includes a "SpatialRelationInfo" field for SRS and a "SpatialRelationInfo" field for PUSCH. It is noted that they may have different bit widths.

DL grant: the DL grant includes a "SpatialRelationInfo" field for SRS.

The above implementation scheme follows a situation where "SpatialRelationInfo" fields exist for SRS and PUSCH respectively.

Optionally, "SpatialRelationInfo" for the SRS and "SpatialRelationInfo" for the PUSCH are jointly coded in the UL grant, and the parameter of the joint coding may indicate both "SpatialRelationInfo" for the SRS and "SpatialRelationInfo" for the PUSCH.

Optionally, there is a mapping relationship between the UL Tx beam of the PUSCH and the transmission beam of the SRS. The DCI includes a "SpatialRelationInfo" indicator, and the transmission beams of the SRS and the PUSCH may be determined according to the "SpatialRelationInfo". For example, "SpatialRelationInfo" in the DCI indicates the uplink transmission beam of the SRS, and the UE may obtain the uplink transmission beam of the PUSCH according to the mapping relationship between the UL Tx beam of the PUSCH and the transmission beam of the SRS and according to the transmission beam of the SRS. Optionally, "SpatialRelationInfo" in the DCI indicates the uplink transmission beam of the PUSCH, and the UE may obtain the uplink transmission beam of the SRS according to the transmission beam of the PUSCH and according to the mapping relationship between the UL Tx beam of the PUSCH and the transmission beam of the SRS. The mapping relationship may be fixed, or predefined, or predetermined by the base station and the terminal. Optionally, the uplink transmission beam indicated by "SpatialRelationInfo" in the DCI is used for both the SRS and the PUSCH.

Optionally, a manner for determining the transmission beam of the uplink signal corresponding to "SpatialRelationInfo" according to "SpatialRelationInfo" and transmitting the uplink signal is as follows: a reference signal is indicated in "SpatialRelationInfo", and if the reference signal is an uplink reference signal (for example, an SRS), the terminal sends the uplink signal by using a Spatial Domain filter that is the same as a Spatial Domain filter used when sending the reference signal; if the reference signal is a downlink signal (for example, an SSB or a CSI-RS), the terminal sends the uplink signal by using a Spatial Domain filter that is the same as a Spatial Domain filter used when receiving the reference signal.

In a third optional embodiment of the present disclosure:
1) The transmission beams of the SRS and the PUSCH are both dynamically and explicitly indicated through signaling.
2) The SRS used for providing a reference for the uplink transmission beam of the PUSCH is dynamically indicated (for example, not always based on the latest transmitted SRS).

As a specific implementation of the third optional embodiment, the base station sends SRS transmission indication information in the UL grant, and the SRS transmission indication information is used to indicate the SRS transmission corresponding to the transmission beam of the PUSCH. For example, reference is still made to FIG. 1. It is assumed that PUSCH is codebook-based uplink transmission, the base station configures an SRS resource set for codebook-based uplink transmission, which includes two SRS resources: SRS resource 0 and SRS resource 1. Time t1, . . . , t6 in the figure represents start time of data transmission. If the base station sends a PDCCH carrying UL grant DCI to the terminal at time t5, the SRI thereof indicates the SRS resource 0, and it schedules the PUSCH to start transmission at time t6, then, the SRS transmission instruction information is used to indicate that the transmission beam of the PUSCH is determined according to the transmission beam of the SRS sent in SRS resource 0 at time t1, or the transmission beam of the PUSCH is determined according to the transmission beam of the SRS sent in SRS resource 0 at time t3.

An encoding manner for SRS transmission indication information is as follows: the SRS transmission indication information includes N states, one state indicates one SRS transmission on the SRS resource indicated by the SRI. Taking N=4 as an example, the encoding manner in Table 1 may be used.

TABLE 1

| encoding state of SRS transmission indication information | Meaning |
|---|---|
| 00 | Last SRS transmission before transmitting time of UL grant |

TABLE 1-continued

| encoding state of SRS transmission indication information | Meaning |
| --- | --- |
| 01 | Penultimate SRS transmission before transmitting time of UL grant |
| 02 | Third-to-last SRS transmission before transmitting time of UL grant |
| 03 | Fourth-to-last SRS transmission before transmitting time of UL grant |

The method for transmission beam indication in the embodiments of the present disclosure are described in the above. Compared with the semi-static beam indication method, the embodiments of the present disclosure can improve scheduling flexibility, beam adjustment efficiency, system performance, and robustness of uplink transmission in scenarios such as mobility, rotation or blocking of the terminal.

Based on the above method, embodiments of the present disclosure also provide a device for implementing the above method.

Referring to FIG. 7, embodiments of the present disclosure provide a schematic structural diagram of a base station 700, including: a processor 701, a transceiver 702, a memory 703, and a bus interface.

In the embodiments of the present disclosure, the base station 700 further includes: a computer program stored in the memory 703 and capable of running on the processor 701.

The processor 701 is configured to indicate dynamically a transmission beam of a first uplink signal to a terminal through transmission beam indication information.

Corresponding to the process shown in FIG. 3, the first uplink signal includes at least one of: a sounding reference signal (SRS) or a signal transmitted on a physical uplink control channel (PUCCH).

Corresponding to the process shown in FIG. 4, the first uplink signal is a signal transmitted on a physical uplink shared channel (PUSCH), the transmission beam indication information is used to indicate one or more reference signals from multiple candidate reference signals, the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

Optionally, the candidate reference signals include: the first reference signal, and a reference signal other than the first reference signal.

Optionally, the candidate reference signals only include a reference signal other than the first reference signal.

For example, the first uplink signal is a PUSCH signal in a codebook-based transmission mode, and the uplink reference signal used for CSI acquisition for the first uplink signal is an SRS signal corresponding to an SRS resource in an SRS resource set whose usage is configured as 'codebook' by a high layer signaling; with the method of the embodiments, the base station may indicate another SRS signal to the terminal through the transmission beam indication information, the terminal determines the transmission beam of the PUSCH according to the SRS signal indicated by the transmission beam indication information, and it does not necessarily have to determine the transmission beam of the PUSCH according to the beam of the SRS signal corresponding to the SRS resource in the SRS resource set whose usage is configured as 'codebook'.

For another example, the first uplink signal is a PUSCH signal in a codebook-based transmission mode, the uplink reference signal used for CSI acquisition for the first uplink signal is two SRS resources {SRS 1, SRS 2} included in an SRS resource set whose usage is configured as 'codebook' by a high layer signaling, and the base station instructs the terminal to use SRS 1 to determine a precoding matrix of the PUSCH; with the method in the embodiments, the base station can indicate the SRS signal corresponding to SRS 2 to the terminal through the transmission beam indication information, so that the terminal determines the transmission beam of the PUSCH according to the beam of the SRS signal corresponding to SRS 2.

That is, a solution, in which the base station indicates, in a case that the first uplink signal is a PUSCH signal in a codebook-based transmission mode, the SRS signal corresponding to the SRS resource in the SRS resource set whose usage is configured as 'codebook' by the high layer signaling, to the terminal through the transmission beam indication information, so as to enable the terminal to determine the transmission beam of the PUSCH according to the beam of the SRS signal, is not excluded by the embodiments of the present invention.

The present invention is also applicable to scenarios where the first signal is a non-codebook PUSCH or a PUSCH in other transmission modes. In FIG. 7, a bus architecture may include any quantity of interconnected buses and bridges. Various circuits including one or more processors represented by the processor 701 and a memory represented by the memory 703 are coupled. The bus architecture may further couple various other circuits together, such as a periphery component, a voltage stabilizer and a power management circuit, which are known in the art and are not described herein. A bus interface provides an interface. The transceiver 702 may be multiple elements, i.e., including a transmitter and a receiver, providing a unit for communicating with various other devices on a transmission medium.

The processor 701 is in charge of managing the bus architecture and common processes. The memory 703 may be configured to store data used by the processor 701 in performing operations.

Optionally, the transmission beam indication information includes at least one of the following information:
  a reference signal index of one or more reference signals among multiple candidate reference signals;
  a reference signal identifier of one or more reference signals among multiple candidate reference signals; or,
  an index of one or more transmission beams among multiple candidate transmission beams.

Optionally, the transmission beam indication information is carried in physical layer signaling.

Optionally, the transmission beam of the first uplink signal is explicitly indicated by a predetermined field in the physical layer signaling.

Optionally, the processor 701 is further configured to indicate the transmission beam of the first uplink signal to the terminal through physical layer signaling, where the physical layer signaling carries indication information of the first uplink signal and indication information of the transmission beam of the first uplink signal.

Optionally, the indication information of the first uplink signal and the indication information of the transmission beam of the first uplink signal are respectively indicated by two independent fields in the physical layer signaling.

Optionally, the indication information of the first uplink signal and the indication information of the transmission beam of the first uplink signal are indicated by the same field in the physical layer signaling.

Optionally, there is a pre-configured correspondence between a first uplink signal indicated by the indication information of the first uplink signal and a transmission beam indicated by the indication information of the transmission beam of the first uplink signal.

Optionally, the indication information of the transmission beam of the first uplink signal indicates only one target transmission beam, and the target transmission beam is used for all signals indicated by the indication information of the first uplink signal.

Optionally, there is a correspondence between a target transmission beam indicated by the indication information of the transmission beam of the first uplink signal and transmission beams of all signals included in the first uplink signal.

Optionally, the indication information of the first uplink signal is trigger information for the first uplink signal.

Optionally, the physical layer signaling carries: first beam indication information used to indicate the transmission beam of the first uplink signal, and second beam indication information used to indicate a transmission beam of a second uplink signal.

Optionally, the second uplink signal includes at least one of: an SRS, a signal transmitted on a PUSCH, or a signal transmitted on a PUCCH.

Optionally, the physical layer signaling may also carry first signal indication information for indicating the first uplink signal.

Optionally, the first beam indication information and the second beam indication information are indicated by a joint coding field in the physical layer signaling, and the value of the joint coding field is obtained by joint coding the first beam indication information and the second beam indication information;

or, the first beam indication information and the second beam indication information are respectively indicated by two independent information fields in the physical layer signaling.

Optionally, the physical layer signaling indicates both the transmission beam of the first uplink signal and a transmission beam of a third uplink signal; where the physical layer signaling includes a first information field, the first information field is used to indicate first beam indication information, and there is a mapping relationship between the transmission beam of the first uplink signal and the transmission beam of the third uplink signal.

Optionally, the first uplink signal and the second uplink signal each are a signal from the SRS and the signal transmitted on the PUSCH.

Optionally, in a case that the first uplink signal includes the signal transmitted on the PUSCH, the physical layer signaling further includes indication information of an SRS resource set corresponding to the PUSCH.

Optionally, in a case that the first uplink signal includes the signal transmitted on the PUSCH, the transmission beam indication information includes indication information of an SRS transmission corresponding to the PUSCH.

Optionally, the indication information of the SRS transmission corresponding to the PUSCH includes N values, and there is a one-to-one correspondence between each of the N values and an SRS transmission from latest N transmissions of an SRS resource performed by the terminal before DCI transmission time.

Optionally, the physical layer signaling is downlink control information DCI.

Optionally, the processor 701 is configured to read the program in the memory to perform the following process: instructing the terminal to send the first uplink signal;

the processor 701 is further configured to receive the first uplink signal by using a reception beam corresponding to the transmission beam indication information after indicating dynamically, the transmission beam of the first uplink signal, to the terminal through the transmission beam indication information.

Optionally, the processor 701 is configured to read the program in the memory to perform the following process: instructing the terminal to send the first uplink signal and the third uplink signal;

the processor 701 is further configured to determine reception beams of the first uplink signal and the third uplink signal according to the transmission beam indication information and the mapping relationship and receive the first uplink signal and the third uplink signal by using the reception beams, after indicating dynamically, the transmission beam of the first uplink signal, to the terminal through the transmission beam indication information.

Referring to FIG. 8, embodiments of the present disclosure provide another structure of a base station 80. As shown in FIG. 8, the base station 80 includes:

a transmission and reception unit 801, configured to indicate dynamically a transmission beam of a first uplink signal to a terminal through transmission beam indication information.

Corresponding to the process shown in FIG. 3, the first uplink signal includes at least one of a sounding reference signal SRS or a signal transmitted on a physical uplink control channel PUCCH.

Corresponding to the process shown in FIG. 4, the first uplink signal is a signal transmitted on a physical uplink shared channel (PUSCH), the transmission beam indication information is used to indicate one or more reference signals from multiple candidate reference signals, the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

Figure 9:
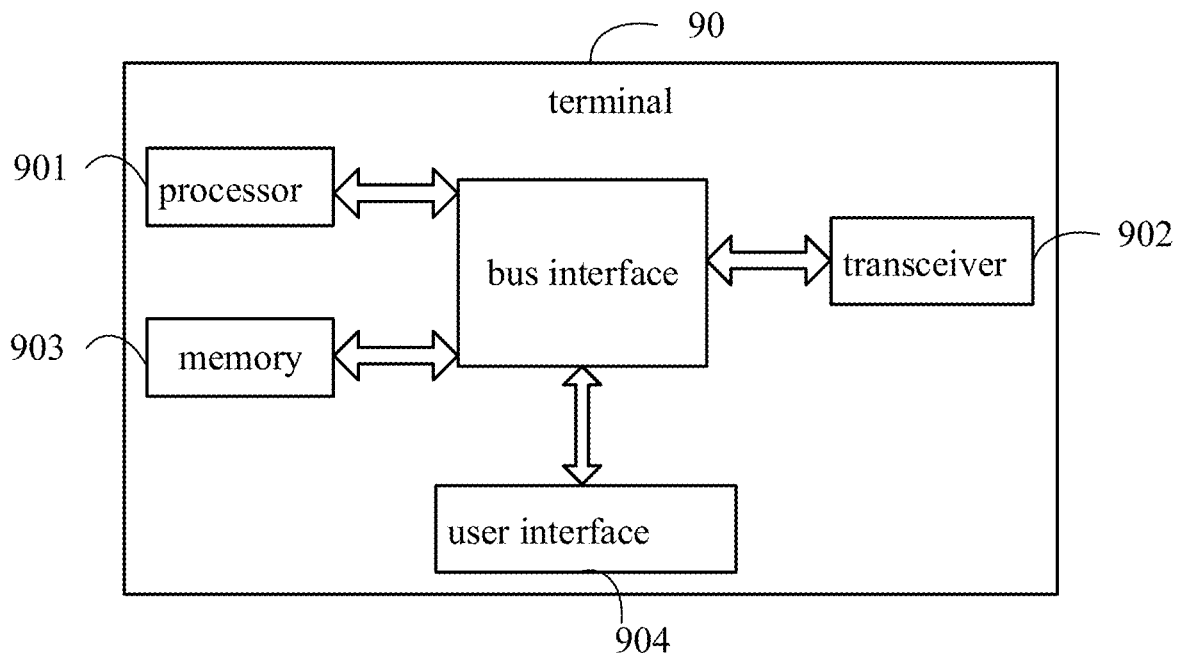
FIG. 9 is a schematic structural diagram of a terminal according to embodiments of the present disclosure.

Reference is made to FIG. 9, which is a schematic structural diagram of a terminal provided by embodiments of the present disclosure. The terminal 90 includes a processor 901, a transceiver 902, a memory 903, a user interface 904, and a bus interface.

In the embodiments of the present disclosure, the terminal 900 further includes a computer program stored in the memory 903 and capable of running on the processor 901.

The transceiver 902 is configured to receive signaling information sent by a base station dynamically, where the signaling information includes transmission beam indication information used to indicate a transmission beam of a first uplink signal.

The processor 901 is configured to read the program in the memory to perform the following process: determining the transmission beam of the first uplink signal according to the signaling information.

Corresponding to the process of FIG. 5, the first uplink signal includes at least one of a sounding reference signal SRS or a signal transmitted on a physical uplink control channel PUCCH.

Corresponding to the process of FIG. 6, the first uplink signal is a signal transmitted on a physical uplink shared channel (PUSCH), the transmission beam indication information is used to indicate an index of one or more reference signals from multiple candidate reference signals, the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

In FIG. 9, a bus architecture may include any quantity of interconnected buses and bridges. Various circuits including one or more processors represented by the processor 901 and a memory represented by the memory 903 are coupled. The bus architecture may further couple various other circuits together, such as a periphery component, a voltage stabilizer and a power management circuit, which are known in the art and are not described herein. A bus interface provides an interface. The transceiver 902 may be multiple elements, i.e., including a transmitter and a receiver, providing a unit for communicating with various other devices on a transmission medium. For different user equipments, the user interface 904 may be an interface capable of connecting externally and internally with the required equipment. The connected equipment includes but not limited to a keypad, a display, a speaker, a microphone, a joystick, etc.

The processor 901 is in charge of managing the bus architecture and common processes. The memory 903 may be configured to store data used by the processor 901 in performing operations.

Optionally, the transmission beam indication information includes at least one of the following information:
 a reference signal index of one or more reference signals among multiple candidate reference signals;
 a reference signal identifier of one or more reference signals among multiple candidate reference signals; or,
 an index of one or more transmission beams among multiple candidate transmission beams.

Optionally, the transmission beam indication information is carried in physical layer signaling.

Optionally, the transmission beam of the first uplink signal is explicitly indicated by a predetermined field in the physical layer signaling.

Optionally, the processor 901 is further configured to receive the physical layer signaling, and determine the transmission beam of the first uplink signal indicated by the base station, where the physical layer signaling carries indication information of the first uplink signal and indication information of the transmission beam of the first uplink signal.

Optionally, the indication information of the first uplink signal and the indication information of the transmission beam of the first uplink signal are respectively indicated by two independent fields in the physical layer signaling; the processor 901 is further configured to obtain the first uplink signal and the transmission beam of the first uplink signal from the two independent fields in the physical layer signaling.

Optionally, the indication information of the first uplink signal and the indication information of the transmission beam of the first uplink signal are indicated by the same field in the physical layer signaling; the processor 901 is further configured to obtain the first uplink signal and the transmission beam of the first uplink signal from the same field in the physical layer signaling.

Optionally, there is a pre-configured correspondence between a first uplink signal indicated by the indication information of the first uplink signal and a transmission beam indicated by the indication information of the transmission beam of the first uplink signal; the processor 901 is further configured to acquire the transmission beam of the first uplink signal, from the physical layer signaling; and determine a first uplink signal corresponding to the transmission beam of the first uplink signal, according to the pre-configured correspondence.

For example, in the same field in the physical layer signaling, the first uplink signal indicated by the indication information of the first uplink signal has a pre-configured correspondence with the transmission beam indicated by the indication information of the transmission beam of the first uplink signal in the same field; the processor 901 is further configured to obtain one of: the first uplink signal or the transmission beam of the first uplink signal, from the same field in the physical layer signaling; and determine, according to the pre-configured correspondence, the other kind corresponding to the one kind.

Optionally, indication information of the transmission beam of the first uplink signal only indicates one target transmission beam; the processor 901 is further configured to determine the target transmission beam as a transmission beam of all first uplink signals indicated by the indication information of the first uplink signal.

Optionally, there is a correspondence between a target transmission beam indicated by indication information of the transmission beam of the first uplink signal and a transmission beams of all signals included in the first uplink signal; the processor 901 is further configured to determine the target transmission beam corresponding to each signal included in the first uplink signal, according to the target transmission beam and the correspondence.

Optionally, the indication information of the first uplink signal is trigger information for the first uplink signal.

Optionally, the physical layer signaling carries: first beam indication information used to indicate the transmission beam of the first uplink signal, and second beam indication information used to indicate a transmission beam of a second uplink signal.

Optionally, the second uplink signal includes at least one of: an SRS, a signal transmitted on a PUSCH, or a signal transmitted on a PUCCH.

Optionally, the physical layer signaling further carries: first signal indication information used to indicate the first uplink signal.

Optionally, the first beam indication information and the second beam indication information are indicated by a joint coding field in the physical layer signaling, and the value of the joint coding field is obtained by joint coding the first beam indication information and the second beam indication information; the processor 901 is further configured to obtain the first beam indication information and the second beam indication information from the joint coding field in the physical layer signaling, to obtain the transmission beam of the first uplink signal and the transmission beam of the second uplink signal.

Optionally, the first beam indication information and the second beam indication information are respectively indicated by two independent information fields in the physical layer signaling; the processor 901 is further configured to obtain the first beam indication information and the second beam indication information respectively from the two independent information fields in the physical layer signaling, to obtain the transmission beam of the first uplink signal and the transmission beam of the second uplink signal.

Optionally, the physical layer signaling indicates both the transmission beam of the first uplink signal and a transmission beam of a third uplink signal, the physical layer signaling includes a first information field, the first information field is used to indicate first beam indication information, and there is a mapping relationship between the transmission beam of the first uplink signal and the transmission beam of the third uplink signal; the processor 901 is further configured to acquire the transmission beam of the first uplink signal from the first information field in the physical layer signaling; and determine the transmission beam of the third uplink signal according to the transmission beam of the first uplink signal and the mapping relationship.

Optionally, the first uplink signal and the second uplink signal each are a signal from the SRS and the signal transmitted on PUSCH.

Optionally, in a case that the first uplink signal includes the signal transmitted on the PUSCH, the physical layer signaling further includes indication information of an SRS resource set corresponding to the PUSCH; the processor 901 is further configured to determine the SRS resource set corresponding to the PUSCH according to the indication information of the SRS resource set corresponding to the PUSCH.

Optionally, in a case that the first uplink signal includes the signal transmitted on the PUSCH, the transmission beam indication information includes indication information of an SRS transmission corresponding to the PUSCH.

Optionally, the indication information of the SRS transmission corresponding to the PUSCH includes N values, and there is a one-to-one correspondence between each of the N values and an SRS transmission from latest N transmissions of an SRS resource performed by the terminal before DCI transmission time; the processor 901 is further configured to determine, according to a value of the indication information of the SRS transmission, the SRS transmission corresponding to the value; and determine, according to a transmission beam used for the determined SRS transmission, the transmission beam of the signal transmitted on the PUSCH.

Optionally, the physical layer signaling is downlink control information DCI.

Optionally, the processor 901 is further configured to receive indication information that is sent by the base station and is used for instructing the terminal to send the first uplink signal; and transmit the first uplink signal by using the determined transmission beam of the first uplink signal, after determining the transmission beam of the first uplink signal.

Optionally, the processor 901 is further configured to receive indication information that is sent by the base station and is used for instructing the terminal to send the first uplink signal and the third uplink signal; and transmit, the first uplink signal and the third uplink signal, by using the determined transmission beams of the first uplink signal and the third uplink transmission signal, after determining the transmission beams of the first uplink signal and the third uplink transmission signal.

Figure 10:
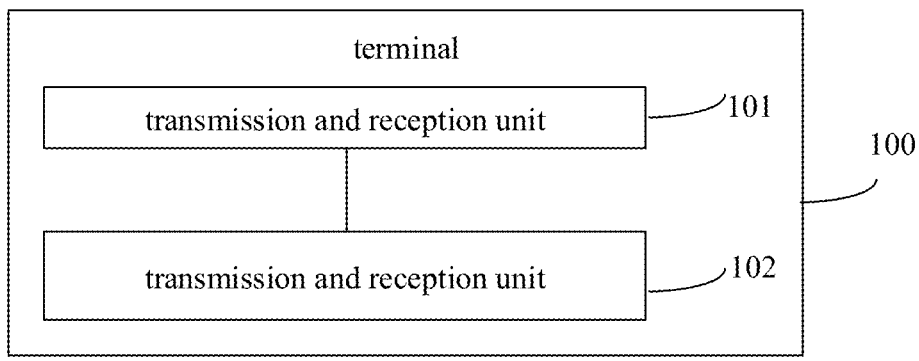
FIG. 10 is another schematic diagram of a terminal according to embodiments of the present disclosure.

Referring to FIG. 10, embodiments of the present disclosure provide another terminal 100, including:
- a transmission and reception unit 101, configured to receive signaling information sent by a base station dynamically, where the signaling information includes transmission beam indication information used to indicate a transmission beam of a first uplink signal; and
- a beam determining unit 102, configured to determine the transmission beam of the first uplink signal according to the signaling information.

Corresponding to the process of FIG. 5, the first uplink signal includes at least one of: a sounding reference signal (SRS) or a signal transmitted on a physical uplink control channel (PUCCH).

Corresponding to the process of FIG. 6, the first uplink signal is a signal transmitted on a physical uplink shared channel (PUSCH), the transmission beam indication information is used to indicate an index of one or more reference signals from multiple candidate reference signals, and the candidate reference signals include a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

In the embodiments provided in the present application, it should be understood that the transmission beam described in the solutions of the embodiments of the present disclosure may correspond to a certain specific type of transmission beam, for example, only for analog transmission beam, or for hybrid analog and digital transmission beam, etc. It should be understood that the transmission (reception) beam described in the specification may be referred to as transmission (reception) precoding, transmission (reception) beamforming, etc., in some documents, and application and scope of the present disclosure should not be limited by naming of the terms.

Those skilled in the art will appreciate that the units and the algorithm steps described in conjunction with the embodiments according to the present disclosure may be implemented in the form of electronic hardware or a combination of computer software and electronic hardware. Whether these functions are performed in hardware or in software depends on the specific application and design constraints of the technical solution. Those skilled in the art may use different methods to implement the described functions for each particular application, and such implementations are not to be considered as departing from the scope of the present disclosure. Electronic hardware may include, but not limited to, an electronic circuit, an application specific integrated circuit (ASIC), a programmable logic device, a programmable processor, and the like.

Those skilled in the art can clearly understand that, for the sake of easiness and conciseness of description, reference can be made to the corresponding processes in the foregoing method embodiments for specific operating processes of the systems, the devices and the units described above, and a repeated description thereof is omitted herein.

It should be understood that in the embodiments according to the present disclosure, the disclosed device and method may be implemented in other ways. For example, the described embodiments directed to the device are merely exemplary. For example, the units are divided merely in logical function, which may be divided in another way in actual implementation, e.g., multiple units or components may be combined or integrated into another device, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the object of the technical solutions of the embodiments of the present disclosure.

In addition, functional units in various embodiments of the present disclosure may be integrated into one processing unit, or may be physically independent, or two or more units may be integrated into one unit.

If the function is implemented in the form of a software functional unit, and sold or used as a standalone product, it may be stored in a computer readable storage medium. Based on this understanding, essence of the technical solution of the present disclosure, or the part contributing to the related technologies, or part of the technical solution, may be embodied in the form of a software product. The computer software product is stored in a storage medium, and the software product includes a number of instructions to enable a computer device (which may be a personal computer, a server, or a network device, etc.) to perform all or part of the steps of method for uplink beam indication described in the various embodiments of the present disclosure. The storage medium includes a USB flash disk, a mobile hard disk, a read-only memory (ROM), a random access memory (RAM), a magnetic disk, an optical disk, and other medium which can store program code.

The above descriptions merely illustrate specific implementations of the present disclosure, and the protection scope of the present disclosure is not limited thereto. Any modification or substitution made by those skilled in the art without departing from the technical scope of the present disclosure shall fall within the protection scope of the present disclosure. Therefore, the protection scope of the present disclosure is determined by the protection scope of the claims.

What is claimed is:

1. A method for uplink beam indication, comprising:
dynamically indicating, by a base station, a transmission beam of a first uplink signal, to a terminal through transmission beam indication information; wherein:
the first uplink signal is a signal transmitted on a physical uplink shared channel PUSCH), the transmission beam indication information is used to indicate one or more reference signals from a plurality of candidate reference signals, the candidate reference signals comprise a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

2. The method according to claim 1, wherein the transmission beam indication information is carried in physical layer signaling.

3. The method according to claim 2, wherein the method comprises at least one of the following items:
(i) wherein the physical layer signaling carries: first beam indication information used to indicate the transmission beam of the first uplink signal, and second beam indication information used to indicate a transmission beam of a second uplink signal;
(ii) wherein the physical layer signaling indicates both the transmission beam of the first uplink signal and a transmission beam of a third uplink signal; and wherein the physical layer signaling comprises a first information field, the first information field is used to indicate first beam indication information, and there is a mapping relationship between the transmission beam of the first uplink signal and the transmission beam of the third uplink signal;
(iii) wherein the first uplink signal comprises the signal transmitted on the PUSCH, the physical layer signaling further comprises indication information of an SRS resource set corresponding to the PUSCH; or,
(iv) wherein the first uplink signal comprises the signal transmitted on the PUSCH, the transmission beam indication information comprises indication information of an SRS transmission corresponding to the PUSCH.

4. The method according to claim 3, further comprising: instructing, by the base station, the terminal to send the first uplink signal and the third uplink signal;
wherein after the indicating dynamically, the transmission beam of the first uplink signal, to the terminal through the transmission beam indication information, the method further comprises:
determining reception beams of the first uplink signal and the third uplink signal according to the transmission beam indication information and the mapping relationship, and receiving the first uplink signal and the third uplink signal by using the reception beams.

5. The method according to claim 3, wherein the indication information of the SRS transmission corresponding to the PUSCH comprises N values, and there is a one-to-one correspondence between each of the N values and an SRS transmission from latest N transmissions of an SRS resource performed by the terminal before DCI transmission time.

6. The method according to claim 1, wherein the step of indicating dynamically the transmission beam of the first uplink signal to the terminal comprises:
indicating, by the base station, the transmission beam of the first uplink signal to the terminal through physical layer signaling, wherein the physical layer signaling carries indication information of the first uplink signal and indication information of the transmission beam of the first uplink signal.

7. The method according to claim 6, wherein the method comprises at least one of the following items:
(i) there is a pre-configured correspondence between a first uplink signal indicated by the indication information of the first uplink signal and a transmission beam indicated by the indication information of the transmission beam of the first uplink signal;
(ii) wherein the indication information of the transmission beam of the first uplink signal indicates only one target transmission beam, and the target transmission beam is used for all signals indicated by the indication information of the first uplink signal;
(iii) wherein there is a correspondence between a target transmission beam indicated by the indication information of the transmission beam of the first uplink signal and transmission beams of all signals comprised in the first uplink signal; or,
(iv) wherein the indication information of the first uplink signal is trigger information for the first uplink signal.

8. The method according to claim 1, further comprising: instructing, by the base station, the terminal to send the first uplink signal;

wherein after the indicating dynamically, the transmission beam of the first uplink signal, to the terminal through the transmission beam indication information, the method further comprises:

receiving, by the base station, the first uplink signal by using a reception beam corresponding to the transmission beam indication information.

9. A method for uplink beam indication, comprising:
receiving signaling information sent by a base station dynamically, wherein the signaling information comprises transmission beam indication information used to indicate a transmission beam of a first uplink signal; and determining the transmission beam of the first uplink signal according to the signaling information; wherein:

the first uplink signal is a signal transmitted on a physical uplink shared channel (PUSCH), the transmission beam indication information is used to indicate an index of one or more reference signals from a plurality of candidate reference signals, the candidate reference signals comprise a reference signal other than a first reference signal, and the first reference signal is a reference signal corresponding to an uplink reference signal resource that is configured by the base station for a terminal and is used for acquiring channel state information (CSI) in an uplink transmission mode corresponding to the PUSCH.

10. The method according to claim 9, wherein the transmission beam indication information is carried in physical layer signaling.

11. The method according to claim 10, wherein the step of receiving the signaling information comprises:

receiving the physical layer signaling by the terminal, and determining the transmission beam of the first uplink signal indicated by the base station, wherein the physical layer signaling carries indication information of the first uplink signal and indication information of the transmission beam of the first uplink signal.

12. The method according to claim 10, wherein the method comprises at least one of the following items:
(i) there is a pre-configured correspondence between a first uplink signal indicated by the indication information of the first uplink signal and a transmission beam indicated by the indication information of the transmission beam of the first uplink signal; and wherein the step of determining the transmission beam of the first uplink signal indicated by the base station comprises:

acquiring the transmission beam of the first uplink signal, from the physical layer signaling; and determining a first uplink signal corresponding to the transmission beam of the first uplink signal, according to the pre-configured correspondence;

(ii) wherein indication information of the transmission beam of the first uplink signal only indicates one target transmission beam; and wherein the step of determining the transmission beam of the first uplink signal according to the signaling information comprises: determining the target transmission beam as a transmission beam of all uplink signals comprised in the first uplink signal;

(iii) wherein there is a correspondence between a target transmission beam indicated by indication information of the transmission beam of the first uplink signal and a transmission beams of all signals comprised in the first uplink signal; and wherein the step of determining the transmission beam of the first uplink signal according to the signaling information comprises: determining the target transmission beam corresponding to each signal comprised in the first uplink signal, according to the target transmission beam and the correspondence; or, (iv) wherein the indication information of the first uplink signal is trigger information for the first uplink signal.

13. The method according to claim 10, wherein the method comprises at least one of the following items:
(i) the transmission beam of the first uplink signal is explicitly indicated by a predetermined field in the physical layer signaling; or,
(ii) wherein the physical layer signaling carries: first beam indication information used to indicate the transmission beam of the first uplink signal, and second beam indication information used to indicate a transmission beam of a second uplink signal.

14. The method according to claim 10, wherein the physical layer signaling indicates both the transmission beam of the first uplink signal and a transmission beam of a third uplink signal, the physical layer signaling comprises a first information field, the first information field is used to indicate first beam indication information, and there is a mapping relationship between the transmission beam of the first uplink signal and the transmission beam of the third uplink signal;

wherein the step of determining the transmission beam of the first uplink signal according to the signaling information comprises: acquiring the transmission beam of the first uplink signal from the first information field in the physical layer signaling; and wherein after receiving the signaling information sent by the base station dynamically, the method further comprises: determine the transmission beam of the third uplink signal according to the transmission beam of the first uplink signal and the mapping relationship.

15. The method according to claim 14, further comprising: receiving indication information that is sent by the base station and is used for instructing the terminal to send the first uplink signal and the third uplink signal;

wherein after determining the transmission beams of the first uplink signal and the third uplink transmission signal, the method further comprises: transmitting, by the terminal, the first uplink signal and the third uplink signal, by using the determined transmission beams of the first uplink signal and the third uplink transmission signal.

16. The method according to claim 10, wherein the method comprises at least one of the following items:
(i) the first uplink signal comprises the signal transmitted on the PUSCH, the physical layer signaling further comprises indication information of an SRS resource set corresponding to the PUSCH; and
wherein the method further comprises: determining the SRS resource set corresponding to the PUSCH according to the indication information of the SRS resource set corresponding to the PUSCH; or,
(ii) wherein the first uplink signal comprises the signal transmitted on the PUSCH, the transmission beam indication information comprises indication information of an SRS transmission corresponding to the PUSCH.

17. The method according to claim 10, wherein the first uplink signal comprises the signal transmitted on the PUSCH, the transmission beam indication information comprises indication information of an SRS transmission corresponding to the PUSCH;

the indication information of the SRS transmission corresponding to the PUSCH comprises N values, and there is a one-to-one correspondence between each of the N values and an SRS transmission from latest N transmissions of an SRS resource performed by the terminal before DCI transmission time; and wherein the step of determining the transmission beam of the first uplink signal according to the signaling information comprises:

determining, according to a value of the indication information of the SRS transmission, the SRS transmission corresponding to the value; and determining, according to a transmission beam used for the determined SRS transmission, the transmission beam of the signal transmitted on the PUSCH.

18. The method according to claim 9, further comprising: receiving indication information that is sent by the base station and is used for instructing the terminal to send the first uplink signal;

wherein after the determining the transmission beam of the first uplink signal, the method further comprises: transmitting by the terminal the first uplink signal by using the determined transmission beam of the first uplink signal.

19. A base station for performing the method according to claim 1, comprising: a transceiver, a memory, a processor, and a computer program stored on the memory and executable by the processor, wherein the processor is configured to indicate dynamically a transmission beam of a first uplink signal to a terminal through transmission beam indication information; wherein:

the first uplink signal is a signal transmitted on a physical uplink shared channel (PUSCH), the transmission beam indication information is used to indicate one or more reference signals from a plurality of candidate reference signals, the candidate reference signals comprise a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

20. A terminal, comprising: a transceiver, a memory, a processor, and a computer program stored on the memory and executable by the processor;

wherein the processor is configured to:

receive signaling information sent by a base station dynamically, wherein the signaling information comprises transmission beam indication information used to indicate a transmission beam of a first uplink signal; and determine the transmission beam of the first uplink signal according to the signaling information; wherein:

the first uplink signal is a signal transmitted on a physical uplink shared channel (PUSCH), the transmission beam indication information is used to indicate an index of one or more reference signals from a plurality of candidate reference signals, the candidate reference signals comprise a reference signal other than a first reference signal, and the first reference signal is a reference signal corresponding to an uplink reference signal resource that is configured by the base station for the terminal and is used for acquiring channel state information (CSI) in an uplink transmission mode corresponding to the PUSCH.

* * * * *